(12) United States Patent
Ohara et al.

(10) Patent No.: US 8,927,149 B2
(45) Date of Patent: Jan. 6, 2015

(54) NEGATIVE ELECTRODE FOR LITHIUM ION SECONDARY BATTERY AND BATTERY USING SAME

(75) Inventors: Kenji Ohara, Yokohama (JP); Hiroaki Tanizaki, Yokohama (JP); Norikazu Mineo, Hachioji (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/320,960

(22) PCT Filed: Apr. 13, 2010

(86) PCT No.: PCT/JP2010/056574
§ 371 (c)(1),
(2), (4) Date: Nov. 17, 2011

(87) PCT Pub. No.: WO2010/137415
PCT Pub. Date: Dec. 2, 2010

(65) Prior Publication Data
US 2012/0070736 A1    Mar. 22, 2012

(30) Foreign Application Priority Data

May 28, 2009 (JP) ................................ 2009-128966
Sep. 24, 2009 (JP) ................................ 2009-219109

(51) Int. Cl.
*H01M 4/13* (2010.01)
(Continued)

(52) U.S. Cl.
CPC ................ *H01M 4/13* (2013.01); *H01M 4/622* (2013.01); *H01M 2004/027* (2013.01); *H01M 4/70* (2013.01); *H01M 4/667* (2013.01); *Y02T 10/7011* (2013.01); *H01M 4/625* (2013.01); *H01M 4/62* (2013.01); *Y02E 60/122* (2013.01); *H01M 4/66* (2013.01); *H01M 4/76* (2013.01); *H01M 10/052* (2013.01)
USPC ........... 429/212; 429/141; 429/209; 429/217; 429/249

(58) Field of Classification Search
CPC .... H01M 4/00; H01M 10/00; H01M 2300/00
USPC ......... 429/132, 141, 208, 209, 212, 215, 217, 429/231.95, 237, 249
See application file for complete search history.

(56) References Cited

U.S. PATENT DOCUMENTS 6,025,095 A    2/2000   Kawamura
6,416,905 B1   7/2002   Bronstert et al.
(Continued)

FOREIGN PATENT DOCUMENTS

CN    1180938 A    5/1998
CN    1780036 A    5/2006
(Continued)

OTHER PUBLICATIONS

Chinese Office Action dated Sep. 2, 2013, (12 pages).
(Continued)

*Primary Examiner* — Patrick Ryan
*Assistant Examiner* — Ben Lewis
(74) *Attorney, Agent, or Firm* — Foley & Lardner LLP

(57) ABSTRACT

There is provided a negative electrode for a lithium-ion secondary battery, including a conductive substrate, a negative electrode active material layer containing a negative electrode active material capable of absorbing and desorbing lithium ions and a conductive member having a lower elastic modulus than that of the conductive substrate, wherein at least part of the negative electrode active material is connected to the conductive substrate via the conductive member. There is also provided a lithium-ion secondary battery with such a negative electrode.

9 Claims, 10 Drawing Sheets

1

(51) Int. Cl.
*H01M 4/62* (2006.01)
*H01M 4/70* (2006.01)
*H01M 4/66* (2006.01)
*H01M 4/76* (2006.01)
H01M 4/02 (2006.01)
H01M 10/052 (2010.01)

(56) References Cited

U.S. PATENT DOCUMENTS

| | | | |
|---|---|---|---|
| 6,465,125 B1 * | 10/2002 | Takami et al. | 429/127 |
| 7,118,694 B2 | 10/2006 | Bronstert et al. | |
| 7,252,907 B2 | 8/2007 | Takeuchi et al. | |
| 7,385,801 B2 | 6/2008 | Ando et al. | |
| 7,427,455 B2 | 9/2008 | Lee et al. | |
| 2004/0106042 A1 | 6/2004 | Asari et al. | |
| 2005/0048367 A1 | 3/2005 | Igaki et al. | |
| 2006/0110661 A1 | 5/2006 | Lee et al. | |
| 2006/0127773 A1 | 6/2006 | Kawakami et al. | |
| 2007/0212611 A1 * | 9/2007 | Nishijima et al. | 429/232 |
| 2008/0286651 A1 * | 11/2008 | Neudecker et al. | 429/209 |

FOREIGN PATENT DOCUMENTS

| | | | | |
|---|---|---|---|---|
| CN | 101174685 A | 5/2008 | | |
| EP | 1 511 100 A2 | 3/2005 | | |
| JP | 5-6778 A | 1/1993 | | |
| JP | 09-097625 | * 4/1997 | ........... | H01M 10/40 |
| JP | 9-97625 A | 4/1997 | | |
| JP | 2000-251884 A | 9/2000 | | |
| JP | 2001-357854 A | 12/2001 | | |
| JP | 2004-80019 A | 3/2004 | | |
| JP | 2004-259636 A | 9/2004 | | |
| JP | 2005-63953 A | 3/2005 | | |
| JP | 2006-286427 A | 10/2006 | | |
| JP | 2007-165079 A | 6/2007 | | |
| RU | 2213395 C2 | 9/2003 | | |
| WO | WO 2004-097867 A2 | 11/2004 | | |

OTHER PUBLICATIONS

Chinese Office Action, Apr. 30, 2014, 9 pages.
European Office Action dated Aug. 19, 2014, 7 pgs.

* cited by examiner

FIG. 8A
Step 1
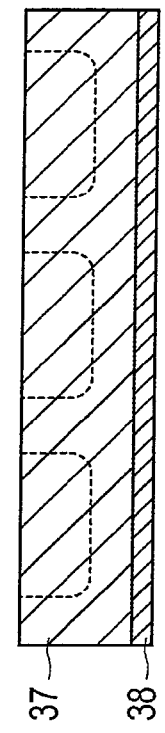
Step 2
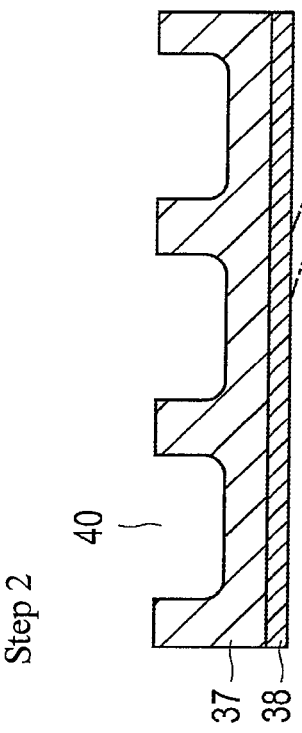
Step 3
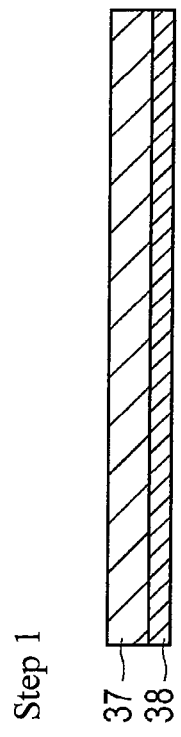
FIG. 8B
Step 1
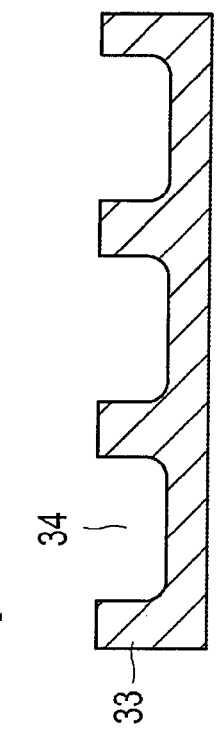
Step 2
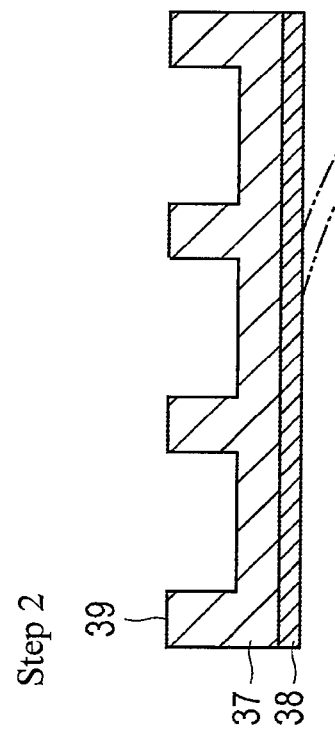
Step 3
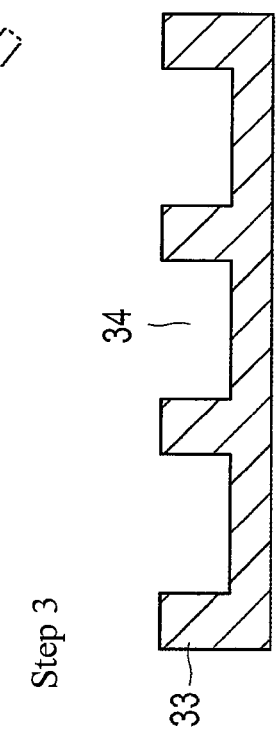

NEGATIVE ELECTRODE FOR LITHIUM ION SECONDARY BATTERY AND BATTERY USING SAME

TECHNICAL FIELD

The present invention relates to an negative electrode for a lithium-ion secondary battery and a battery using the same.

BACKGROUND ART

In recent years, the reduction of carbon dioxide emissions has been sincerely desired in order to address global warming. The automotive industry has a growing expectation on the introduction of electric vehicles and hybrid electric vehicles for the reduction of carbon oxide emissions and has been intensively developing secondary batteries for motor drives, which become key to the practical application of these electric vehicles.

As the secondary batteries for motor drives, attentions are being given to lithium-ion secondary batteries having relatively high theoretical energy. The development of such lithium-ion secondary batteries is pursued rapidly at present. In the lithium-ion secondary battery, there are generally provided a positive electrode in which a positive electrode active material is applied to a positive electrode collector by a binder and a negative electrode in which a negative electrode active material is applied to a negative electrode collector by a binder. The positive electrode and the negative electrode are connected to each other via a liquid or solid electrolyte layer and are accommodated in a battery case. The lithium-ion secondary battery thus undergoes a charge/discharge reaction due to the absorption and desorption of lithium ions by the electrode active materials.

Alloy materials and carbon materials are used as the negative electrode active material of the lithium-ion secondary battery. The electrode active material however expands and contracts in response to the absorption and desorption of lithium ions during the charge/discharge reaction of the battery. For example, a carbon-based negative electrode active material such as graphite shows a volume change of about 10%; and an alloy-based negative electrode active material shows a volume change of nearly 200%.

When the active material shows a large volume expansion, the active material may be broken into fine pieces and separated from the collector during repeated charge/discharge cycles. Further, the electrode itself may be largely twisted and deformed when the collector sustains large stress in response to the volume change of the active material thin-film layer. There thus arises a problem that it is likely that the cycle characteristics of the battery will deteriorate as the contact between the active materials becomes reduced by the change of the electrode structure during the repeated charge/discharge cycles.

In order to solve such a problem, Patent Document 1 discloses a negative electrode for a non-aqueous electrolyte secondary battery, which has a foam metal as a collector and silicon supported as an active material on the foam metal. It is reported that it is possible by such an electrode configuration to prevent separation of the active material during charge/discharge cycles for improvements in charge/discharge cycle characteristics.

PRIOR ART DOCUMENTS

Patent Documents

Patent Document 1:
Japanese Laid-Open Patent Publication No. 2004-259636

SUMMARY OF THE INVENTION

Problems to be Solved by the Invention

In the negative electrode of Patent Document 1, however, the area of contact between the silicon active material and the foam metal collector is large as the foam metal collector has a large surface area. This results in the occurrence of large stress by expansion and contraction of the active material during charging/discharging whereby it may not be possible to adequately prevent separation of the active material from the electrode.

Means for Solving the Problems

The present invention was made in view of the above circumstances. It is an object of the present invention to provide a negative electrode for a lithium-ion secondary battery, which has means for preventing separation of an active material from a collector due expansion and contraction of the active material during charging/discharging. It is also an object of the present invention to provide a lithium-ion secondary battery capable of maintaining an electrode structure during charging/discharging and showing good charge/discharge cycle resistance.

Namely, there is provided according to a first aspect of the present invention a negative electrode for a lithium-ion secondary battery, comprising: a conductive substrate; a negative electrode active material layer containing a negative electrode active material capable of absorbing and desorbing lithium ions; and a conductive member having a lower elastic modulus than that of the conductive substrate, wherein at least part of the negative electrode active material is connected to the conductive substrate via the conductive member.

There is provided according to a second aspect of the present invention a lithium-ion secondary battery, comprising the above negative electrode.

BRIEF DESCRIPTION OF THE DRAWINGS

FIG. 8A is a schematic view showing a process for manufacturing the porous structural body of the negative electrode for the lithium-ion secondary battery according to the third embodiment of the present invention.

FIG. 8B is a schematic view showing another process for manufacturing the porous structural body of the negative electrode for the lithium-ion secondary battery according to the third embodiment of the present invention.

BEST MODES FOR CARRYING OUT THE INVENTION

Figure 1:
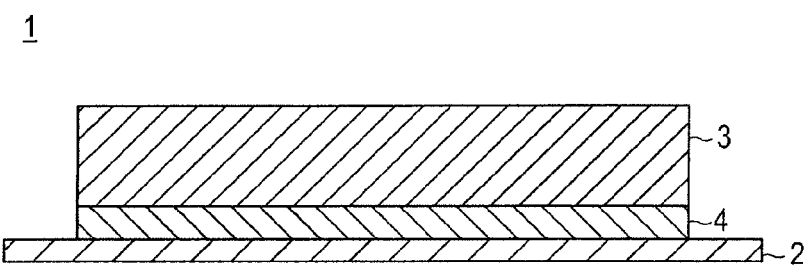
FIG. 1 is a section view of a negative electrode for a lithium-ion secondary battery according to a first embodiment of the present invention.

Hereinafter, preferred embodiments of the present invention will be described in detail below with reference to the drawings. It is noted that the present invention is not limited to the following embodiments and can be practiced in any other embodiments. In the drawings, like parts and portions are designated by like reference numerals to omit repeated explanations thereof. The dimensions of the respective parts and portions may be exaggerated for purposes of illustration in the drawings and may be different from the actual dimensions.

[Negative Electrode for Lithium-Ion Secondary Battery]

A negative electrode for a lithium-ion secondary battery according to the present invention includes a conductive substrate, a negative electrode active material layer containing a negative electrode active material capable of absorbing and desorbing lithium ions and a conductive member having a lower elastic modulus than that of the conductive substrate, characterized in that: at least part of the negative electrode active material is connected to the conductive substrate via the conductive member.

[First Embodiment]

FIG. 1 is a section view of negative electrode 1 for a lithium-ion secondary battery according to a first embodiment of the present invention. As shown in FIG. 1, negative electrode 1 for the lithium-ion secondary battery has collector 2 (as a conductive substrate), negative electrode active material layer 3 formed on a surface of collector 2 and conductive buffer layer 4 (as a conductive member) arranged between collector 2 and negative electrode active material layer 3. In the first embodiment, collector 2 is formed of a metal foil. Negative electrode active material layer 3 contains negative electrode active material 3a capable of absorbing and desorbing lithium ions. Conductive buffer layer 4 contains elastic conductive material 4a and a binder and has a lower elastic modulus than that of collector 2.

Figure 2:
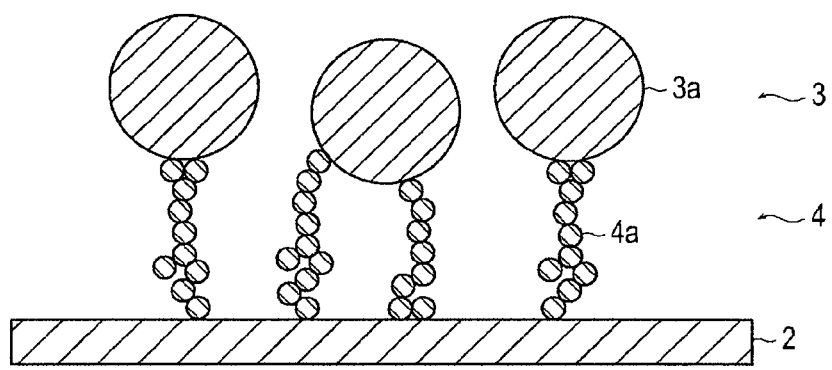
FIG. 2 is a schematic enlarged section view showing the positional relationship of a collector, a negative electrode active material and a conductive material in the negative electrode for the lithium-ion secondary battery according to the first embodiment of the present invention.

FIG. 2 is a schematic enlarged section view showing the positional relationship of collector 2, negative electrode active material layer 3 and conductive buffer layer 4 in negative electrode 1 for the lithium-ion secondary battery. Although negative electrode 1 can in fact include any other materials, those materials are herein omitted from the drawing. Negative electrode active material 3a of negative electrode active material layer 3 is electrically connected to and elastically linked to the surface of collector 2 by conductive material 4a of conductive buffer layer 4 as shown in FIG. 2. It is possible by such a configuration that, even when negative electrode active material 3a expands and contracts during charging/discharging of the battery in which negative electrode 1 is used, conductive material 4a can absorb stress caused by the expansion and contraction of electrode active material 3a.

It is herein noted that, although negative electrode active material layer 3 is illustrated only on one side of collector 2 in the first embodiment of FIGS. 1 and 2 for the sake of simplicity, active material layers are generally formed on both sides of collector 2. In the case of use in a bipolar battery, a positive electrode active material layer is formed on one side of collector 2; and negative electrode active material layer 3 is formed on the other side of collector 2. In the case of use in a non-bipolar battery, negative electrode active material layers 3 are formed on both sides of collector 2.

The structural parts of negative electrode 1 will be explained below sequentially.

[Collector]

Collector 2 is a structural part that electrically connects negative electrode active material layer 3 to any external member and is formed of a conductive material. There is no particular limitation on the form of collector 2. As long as collector 2 exhibits electrical conductivity, the material and structure of collector 2 are not particularly limited. Collector 2 can be in any form conventionally known and commonly used for lithium-ion secondary batteries. As the material of collector 2, there can be used conductive metals such as copper, nickel, aluminum, titanium, iron, silver and stainless steel (SUS). Among others, copper is particularly preferred. As the structure of collector 2, there can be used not only a foil structure as shown in FIGS. 1 and 2 but also a nonwoven fabric structure, a porous structure or a plate structure. In some cases, collector 2 may have a laminated structure of two or more metal foils. There is also no particular limitation on the thickness of collector 2. The thickness of collector 2 is generally of the order of 5 to 50 µm. The size of collector 2 is determined depending on the purpose of use of the lithium-ion secondary battery.

[Negative Electrode Active Material Layer]

Negative electrode active material layer 3 contains negative electrode active material 3a and may optionally further contain a conductive material for improvement in electrical conductivity, a binder, an electrolyte material (polymer matrix, ion conductive polymer, electrolyte solution etc.), an electrolyte support salt (lithium salt) for improvement in ion conductivity and the like.

There is no particular limitation on the compounding ratio of the component materials of negative electrode active material layer 3. The component material compounding ratio of negative electrode active material layer 3 is adjusted as appropriate in the light of any knowledge about lithium-ion secondary batteries. There is also no particular limitation on the thickness of negative electrode active material layer 3. The thickness of negative electrode active material layer 3 is set in the light of any knowledge about lithium-ion secondary batteries. By way of example, the thickness of negative electrode active material layer 3 is of the order of 2 to 100 μm.

(Negative Electrode Active Material)

There is no particular limitation on negative electrode active material 3a as long as negative electrode active material 3a consists of or comprises any substance capable of absorbing and desorbing lithium ions. Any conventionally known negative electrode active materials can be used.

It is particularly preferable that negative electrode active material 3a contains a lithium-alloying element. As negative electrode active material 3a containing such a lithium-alloying element, there can suitably be used any of lithium-alloying elements alone and oxides or carbides thereof. The battery can attain higher energy density and capacity by the use of the lithium-alloying element than by the use of conventional carbon materials. When the lithium-alloying element is contained in negative electrode active material 3a, negative electrode active material 3a generally shows a large volume change due to its expansion and contraction during charging/discharging of the battery. Thus, the effects of the present invention that it is possible to reduce stress caused by the expansion and contraction of negative electrode active material 3a during charging/discharging of the battery are more pronounced when the lithium-alloying element is contained in negative electrode active material 3a.

Examples of the lithium-alloying element include, but are not limited to, Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te and Cl. In order to achieve high battery capacity and energy density, it is preferable that negative electrode active material contains at least one kind of element selected from the group consisting of Si, Ge, Sn, Pb, Al, In and Zn, more preferably Si or Sn, still more preferably Si. Examples of the oxide include silicon monoxide (SiO), $SiO_X$ (0<x<2), tin dioxide ($SnO_2$), $SnO_X$ (0<x<2) and $SnSiO_3$. Examples of the carbide include silicon carbide (SiC).

There can also suitably be used carbon materials as negative electrode active material 3a. When the carbon material is used as negative electrode active material 3a, negative electrode active material 3a also shows a large volume change due to its expansion and contraction during charging/discharging of the battery. The effects of the present invention that it is possible reduce stress caused by the expansion and contraction of negative electrode active material 3a during charging/discharging of the battery are thus more pronounced when the carbon material is used as negative electrode active material 3a.

Examples of the carbon material include: high-crystalline carbon materials such as graphite (natural graphite, artificial graphite etc.); low-crystalline carbon materials (soft carbon, hard carbon etc.); carbon blacks (Ketjen Black, Acetylene Black, Channel Black, Lamp Black, Oil Furnace Black, Thermal Black etc.); fullerenes, carbon nanotubes, carbon nanofibers, carbon nanohorns and carbon fibrils.

There can also be used metal materials such as lithium metal, lithium-transition metal composite oxides such as lithium-titanium composite oxide (lithium titanate: $Li_4Ti_5O_{12}$) and any other known negative electrode active materials. In some cases, two or more of these negative electrode active materials may be used in combination.

The above negative electrode active materials can be used solely or in combination of two or more thereof.

There is no particular limitation on the shape and size of negative electrode active material 3a. Negative electrode active material 3a can be in various particulate forms such as spherical (powder) form, plate form, needle form, columnar form and horn form. In this case, the particle size of negative electrode active material 3a is preferably 1 to 100 μm, more preferably 1 to 20 in terms of high capacity, reactivity and cycle resistance. When the particle size of negative electrode active material 3a is in the above range, it is possible to limit increase in the internal resistance of the battery during charging/discharging cycles under high-output conditions and to take out sufficient electric current from the battery. Herein, the particle size of negative electrode active material 3a can be given in the unit of a median diameter as determined by laser diffraction.

It is preferable that active material 3a has a large amount of negative electrode active material substance containing the lithium-alloying element. More specifically, the amount of the active material substance containing the lithium-alloying element in negative electrode active material 3a is preferably 60 mass % or more, more preferably 80 mass % or more, still more preferably 90 mass % or more, especially preferably 100 mass %.

The amount of active material 3a contained in negative electrode active material layer 3 is generally of the order of 40 to 100 mass %, preferably in the range of 50 to 90 mass %, more preferably 70 to 90 mass %, still more preferably 75 to 85 mass %, relative to 100 mass % of the total amount of negative electrode active material layer 3.

(Conductive Material)

The conductive material is added for improvement of the electrical conductivity of negative electrode active material layer 3. There is no particular limitation on the conductive material. Any known conductive material can be used as appropriate. Examples of the conductive material include: carbon blacks such as Acetylene Black, Furnace Black, Channel Black and Thermal Black; carbon fibers such as vapor grown carbon fibers (VGCF); and other carbon materials such as graphite. When the conductive material is contained in active material layer 3, it is possible to form an electron network effectively so as to contribute to improvement in battery output performance.

The amount of the conductive material contained in negative electrode active material layer 3 is generally of the order of 0 to 30 mass %, preferably 1 to 10 mass %, more preferably 3 to 7 mass %, relative to 100 mass % of the total amount of negative electrode active material layer 3.

(Binder)

There is no particular limitation on the binder. Examples of the binder include: thermoplastic resins such as polyvinylidene fluoride (PVdF), carboxymethoxy cellulose (CMC), polytetrafluoroethylene (PTFE), polyvinyl acetate and acrylic resin (e.g. liquid silicon rubber (LSR)); thermosetting resins such as polyimide, epoxy resin, polyurethane resin and urea resin; and rubber materials such as styrene-butadiene rubber (SBR).

The amount of the binder contained in negative electrode active material layer 3 is generally of the order of 0 to 50 mass %, preferably 5 to 45 mass %, more preferably 10 to 25 mass %, still more preferably 15 to 20 mass %, relative to 100 mass % of the total amount of negative electrode active material layer 3.

(Electrolyte Material/Support Salt)

There is no particular limitation on the electrolyte material as long as the electrolyte material functions as a lithium-ion carrier. For example, liquid electrolytes and polymer electrolytes can be used. There is also no particular limitation on the support salt (lithium salt) added for improvement of the ion conductivity of negative electrode active material layer 3. Organic acid anion salts and the like can be used. As the electrolyte material and the support salt of electrode active material layer 3 can be the same as those of the after-mentioned electrolyte layer, detailed explanations of the kinds of the electrolyte material and the support salt will be omitted. Each of the electrolyte material and the support salt may be used solely or in combination of two or more kinds thereof.

There is no particular limitation on the amounts of the electrolyte material and the support salt contained in negative electrode active material layer 3. The amounts of the electrolyte material and the support salt are adjusted as appropriate in the light of any knowledge about lithium-ion secondary batteries.

[Conductive Buffer Layer 4]

Conductive buffer layer 4 contains conductive material 4a and may optionally further contain a binder, an electrolyte material (polymer matrix, ion conductive polymer, electrolyte solution), an electrolyte support salt (lithium salt) and the like. Detailed explanations of these materials will omitted as the same materials as those for negative electrode active material layer 3 as mentioned above can also be used for conductive buffer layer 4.

Conductive material 4a of conductive buffer layer 4 has the function of elastically linking active material 3a to the surface of collector 2. The same conductive material as those for active material layer 3 can be used as conductive material 4a as long as it performs such a function. There can suitably be used various conductive materials having one-dimensional structure (linear structure or branched structure), such as carbon blacks (chain structure) and carbon fibers (fibrous structure), in order to easily perform the function. It is possible by the use of the one-dimensional structured conductive material that, even when negative electrode active material 3a shows a volume change during charging/discharging of the battery, the conductive material can be deformed in response to the volume change of negative electrode active material 3a so as to relieve stress effectively. From this point of view, it is preferable to use any conductive material having a chain structure, more preferably carbon black, most preferably Acetylene Black. In the case of using such a chain-like conductive material, the conductive buffer layer and the active material make point contact, rather than surface contact, therebetween. This favorably allows, when the active material itself is moved during charging/discharging of the battery, the conductive material to follow movements of the active material.

In the case of using the one-dimensional structured conductive material, there is no particular limitation on the size (shorter diameter, longer diameter, aspect ratio etc.) of the conductive material. Preferably, the longer diameter (length) of the conductive material is shorter than the average particle size (D50) of the negative electrode active material of negative electrode active material layer 3. This favorably allows, when conductive buffer layer 4 is deformed during charging/discharging of the battery, the conductive material to follow the deformation of conductive buffer layer 4.

The binder of conductive buffer layer 4 can be of the same kind as that of negative electrode active material layer 3 as long as conductive buffer layer 4 is capable of elastically linking active material 3a to the surface of collector 2. However, the binder of conductive buffer layer 4 preferably has elasticity so as to obtain the advantage that conductive buffer layer 4 can secure its binding property without interfering with the movements of conductive material 4a in response to the volume change of active material 3a. From this point of view, it is preferable to use polyvinylidene fluoride (PVdF), carboxymethoxy cellulose (CMC), polytetrafluoroethylene (PTFE), acrylic resin (e.g. LSR) or rubber material (e.g. styrene-butadiene rubber (SBR)) as the binder of conductive buffer layer 4. In some cases, there can be used any other binder having the same level of elasticity as that of the above-listed materials regardless of whether it is conventionally known or will be newly developed in the future.

There is no particular limitation on the compounding ratio of the component materials of conductive buffer layer 4 as long as active material 3a is elastically linked to the surface of collector 2 by conductive material 4a. It is however preferable that the amount of conductive material 4a in conductive buffer layer 4 is relatively large as compared to the amount of conductive material in negative electrode active material layer 3 so as to secure sufficient elastic linkage of active material 3a to the surface of collector 2 by the formation of conductive buffer layer 4. It is herein defined that, when the content amount of conductive material 4a is "relative large", the amount (A) (mass %) of conductive material 4a relative to 100 mass % of the total amount of conductive buffer layer 4 and the amount (B) (mass %) of the conductive material relative to 100 mass % of the total amount of negative electrode active material layer 3 satisfy the relationship of A>B. It is more preferable to satisfy A>5B, still more preferably A>7B, particularly preferably A>10B.

The amount of conductive material 4a contained in conductive buffer layer 4 (100 mass %) is preferably 30 to 90 mass %, more preferably 40 to 80 mass %, still more preferably 50 to 70 mass %. The amount of the binder contained in conductive buffer layer 4 (100 mass %) is preferably 10 to 70 mass %, more preferably 20 to 60 mass %, still more preferably 30 to 50 mass %. The amount of the other component material is adjusted as appropriate in the light of any knowledge within the range that does not affect the electrode performance.

There is no particular limitation on the thickness of conductive buffer layer 4. Preferably, the thickness of conductive buffer layer 4 is of the order of 0.2 to 10 μm.

As mentioned above, conductive buffer layer 4 (conductive material 4a) can absorb stress caused by expansion and contraction of active material 3a during charging/discharging of the battery in the first embodiment. It is therefore possible to reduce the stress on active material 3a and collector 2 during charging/discharging of the battery and prevent separation of active material 3a from negative electrode 1 effectively.

By setting the amount of conductive material 4a in conductive buffer layer 4 to be relatively large as compared to the amount of the conductive material in negative electrode active material layer 3, it is possible to secure sufficient elastic linkage of active material 3a to the surface of collector 2 by the formation of conductive buffer layer 4. It is also possible by using the chain-like conductive material such as Acetylene Black as conductive material 4a that, even when negative electrode active material 3a shows a volume change during charging/discharging, conductive material 4a can be deformed in response to the volume change of negative electrode active material 3a so as to relieve stress more effectively. Further, it is advantageous in that conductive buffer layer 4 can secure its binding property without interfering with the movements of conductive material 4a in response to the volume change of active material 3a by using the elastic binder in conductive buffer layer 4.

It has been proposed a chemical technique to select and use any appropriate material capable of increasing the binding force between a collector and an active material layer as the means for preventing separation of the active material layer from the collector. However, the effects of such a chemical technique are often limited in the case of using the active material (notably, alloy-based negative electrode active material) that expands and contracts repeatedly during charging/ discharging. In the first embodiment, by contrast, it is possible to obtain the effects such as stress relief and thereby prevention of separation of active material 3a by the adoption of the physical approach of elastically linking active material 3a to collector 2.

[Second Embodiment]

Figure 3:
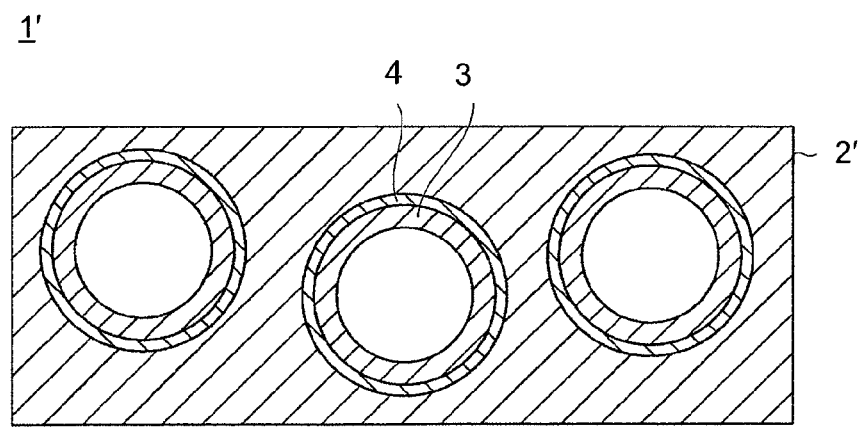
FIG. 3 is a section view of a negative electrode for a lithium-ion secondary battery according to a second embodiment of the present invention.

FIG. 3 is a section view of negative electrode 1' for a lithium-ion secondary battery according to a second embodiment of the present invention. The second embodiment is similar to the first embodiment, except for using porous collector 2'. As shown in FIG. 3, negative electrode active material layer 3 is formed on surfaces of pores of porous collector 2', with conductive buffer layer 4 arranged between porous collector 2' and negative electrode active material layer 3, such that negative electrode active material 3a is electrically connected to and elastically linked to the surface of collector 2' by conductive buffer layer 4.

As mentioned above, it has been proposed a prior art technique in which silicon is supported as an active material on a collector of foam metal. However, the foam metal collector has a large surface area and, by extension, a large area of contact with the active material, and thus sustains large stress by expansion and contraction of the active material whereby it is not possible to sufficiently prevent separation of the active material from the collector.

In the second embodiment, by contrast, active material 3a is elastically linked to the surface of collector 2 by conductive material 4a so that conductive buffer layer 4 (conductive material 4a) can absorb stress caused by expansion and contraction of active material 3a during charging/discharging of the battery. It is therefore possible to relieve stress on active material 3a and collector 2 and prevent separation of active material 3a from collector 2. These effects of the present invention are more pronounced in the second embodiment in which the porous collector 2' faces a noticeable problem of stress by expansion and contraction of active material 3a. The second embodiment can be thus regarded as a preferred embodiment to make effective use of the effects of the present invention.

The material and structure of porous collector 2' are not particularly limited and are selected as appropriate in the light of any knowledge about lithium-ion secondary batteries. Preferably, the porosity of porous collector 2' is 70 to 95%, more preferably 80 to 93%, still more preferably 85 to 90%. When the porosity of porous collector 2' is in the above range, it is possible to sufficiently exert the effects of the present invention while maintaining the strength of collector 2'.

[Production Method of Negative Electrode]

There is no particular limitation on the production method of negative electrodes 1 and 1' of the first and second embodiments. For example, negative electrode 1, 1' can be produced by the following procedure.

First, a slurry (active material slurry) is prepared by dispersing and dissolving the component materials of negative electrode active material layer 3 (negative electrode active material 3a, conductive material, binder etc.) into an appropriate solvent such as N-methyl-2-pyrrolidone (NMP). On the other hand, a slurry (conductive material slurry) is prepared by dispersing and dissolving the component materials of conductive buffer layer 4 (conductive material 4a, binder etc.) into a similar solvent.

Next, collector 2, 2' is prepared separately. Collector 2, 2' may be that purchased commercially or prepared by oneself. In the case of using porous collector 2', there is no particular limitation on the process of preparation of porous collector 2'. Porous collector 2' can be prepared as appropriate with reference to any conventional knowledge. For example, it is feasible to prepare collector 2' by mixing particles of metal such as copper with particles of thermoplastic resin (such as polyethylene) and subjecting the obtained mixture to baking treatment in an inert atmosphere to thereby burn off the resin particles. There can be prepared porous collector 2' of metal particles by the above process. At this time, the conditions of the baking treatment are not particularly limited. The baking treatment can be performed e.g. at a temperature of about 500 to 700° C. for about 3 to 6 hours. Further, the porosity of porous collector 2' can be increased by increasing the amount of the resin particles added.

The conductive material slurry is applied and dried onto a surface of collector 2, 2' (in the case of using porous collector 2', pore surfaces of collector 2'). Similarly, the active material slurry is applied and dried onto the resulting conductive material slurry layer.

It is possible by such a simple method to produce negative electrode 1, 1' with good durability.

Although conductive buffer layer 4 is formed as the conductive member in the first and second embodiments, the technical scope of the present invention is not limited to these embodiments. The conductive member is not necessarily in the form of the layer other than negative electrode active material layer 3, such as conductive buffer layer 4, but can be in any form as long as it is capable of elastically linking active material 3a to the surface of collector 2, 2'.

[Third Embodiment]

Figure 4A:
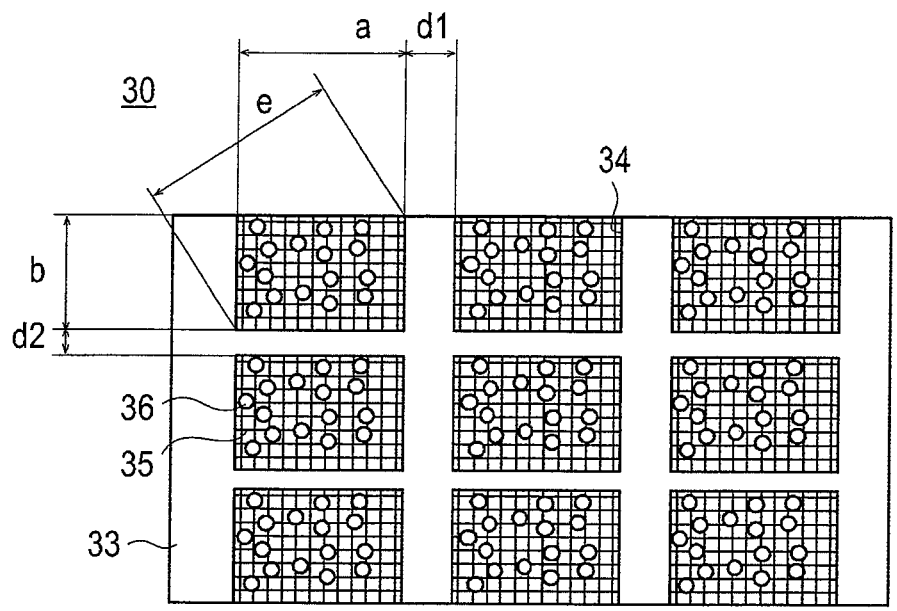
FIG. 4A is a plan view of a negative electrode for a lithium-ion secondary battery according to a third embodiment of the present invention.
Figure 4B:
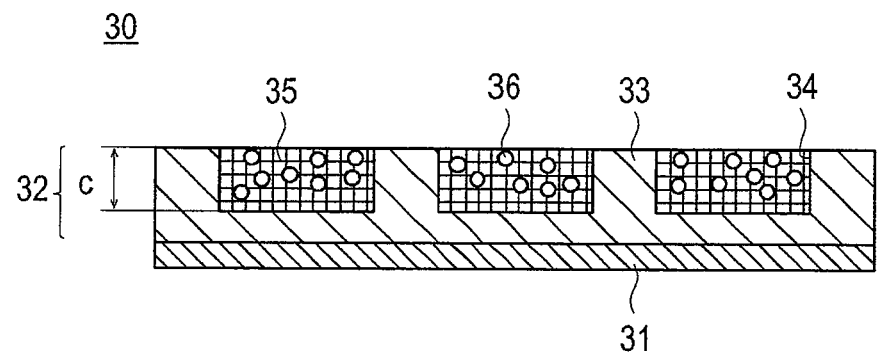
FIG. 4B is a section view of the negative electrode for the lithium-ion secondary battery according to the third embodiment of the present invention.

FIGS. 4A and 4B are a plan view and a section view of negative electrode 30 for a lithium-ion secondary battery according to a third embodiment of the present invention. Negative electrode 30 for the lithium-ion secondary battery has collector 31, porous structural body 33 (as a conductive substrate) having first pores 34 formed in a surface thereof, negative electrode active material layer 32 containing negative electrode active material 36 capable of absorbing and desorbing lithium ions and conductive fibers 35 (as a conductive member) having a lower elastic modulus than that of porous structural body 33. Conductive fibers 35 and negative electrode active material 36 are retained in first pores 34 of porous structural body 33. Negative electrode active material 36 is electrically connected to and elastically linked to the surface of porous structural body 33 by conductive fibers 35. (In other words, conductive substrate 33 and conductive member 35 are embedded in negative electrode active material layer 32 in the third embodiment.)

It is herein noted that, although active material layer 33 is illustrated only on one side of collector 31 in the third embodiment of FIGS. 4A and 4B, active material layers are generally formed on both sides of collector 31.

It is also herein noted that negative electrode 30 is not limited to the above configuration of the third embodiment but can be provided in various configurations. For example, negative electrode 30 may have no collector 31 (negative electrode active material layer 32 may be used as negative electrode 30 as it is) as shown in FIGS. 5A, 5B, 6A and 6B. Further, negative electrode 30 may have any layer or layers other than collector 31 and active material layer 32 as needed as shown in FIGS. 4A, 4B, 5A, 5B, 6A and 6B. Examples of the other layer include, but are not limited to, a metal layer and an adhesive layer.

As active material 36 is filled in first pores 34 of porous structural body 33 at an appropriate porous rate (filling rate), there occurs no change in volume of electrode 30 as a whole even by expansion and contraction of active material 36. Further, conductive fibers 35 follow expansion and contraction of active material 36 and maintain electrical contact between active material 36 and porous structural body 33 as active material 36 is electrically connected to and elastically linked to porous structural body 33 by conductive fibers 35. It is therefore possible to relieve stress caused by expansion and contraction of active material 36 during charging/discharging of the battery, maintain the electrode structure and prevent separation of active material 36. It is further possible to assure good conduction path in negative electrode 30 by maintaining the contact between active material 36, porous structural body 33 and conductive fibers 35 during charging/discharging of the battery.

The structural parts of negative electrode 30 will be explained below sequentially.

[Porous Structural Body]

Porous structural body 33 is a structural part formed with one or more first pores 34 to retain therein electrode materials such as conductive fibers 35 and active material 36. As porous structural body 33, there can be used those having not only electrical conductivity but also mechanical strength to keep its framework even during charging/discharging of the battery. As porous structural body 33 has such a solid framework, it is possible to maintain the structure of porous structural body 33 without causing deformation such as expansion and contraction during charging/discharging of the battery. This allows the electrode materials such as conductive fibers 35 and active material 36 to be retained in such a solid structural body, with adequate space left therein, so that the physical form of electrode 30 can be maintained even when the active material expands and contracts during charging/discharging of the battery.

There is no particular limitation on the arrangement of first pores 34 in porous structural body 33 as long as porous structural body 33 is capable of retaining the electrode materials such as conductive fibers 35 and active material 36 sufficiently and securing the mechanical strength. For example, pores 34 can be formed uniformly throughout porous structural body 33 so as to disperse and retain therein the electrode materials. Pores 34 can alternatively be formed in part of porous structural body 33 so as to retain therein the electrode materials. It is preferable that pores 34 are formed and distributed uniformly throughout porous structural body 33 for quick and uniform charge/discharge reaction.

There is also no particular limitation on the porosity of first pores 34. The porosity of first pores 34 is preferably 20 to 95 volume %, more preferably 50 to 90 volume %. When the porosity of first pores 34 is in the above range, it is possible to secure the mechanical strength of porous structural body 33 and fill the sufficient electrode materials such as conductive fibers 35 and active material 36 in first pores 34 of porous structural body 33.

Further, there is no particular limitation on the pore size of first pores 34. The pore size of first pores 34 is preferably 100 µm to 5 mm, more preferably 500 µm to 3 mm. When the pore size of first pores 34 is in the above range, it is possible to establish a plurality of electrical contacts between conductive fibers 35 and active material 36, while securing the mechanical strength of porous structural body 33, for improvement of the electrical conductivity of electrode 30.

The pore-to-pore width (i.e. the bulkhead width) between first pores 34 is preferably 30 to 200 µm, more preferably 30 to 100 µm. When the pore-to-pore width is 30 µm or larger, it is possible to secure the sufficient mechanical strength of porous structural body 33 and maintain the electrode structure even when active material 36 expands and contracts. When the pore-to-pore width is 200 µm or smaller, it is possible to fill the sufficient amount of active material and prevent deterioration in battery capacity.

The length (depth) of first pores 34 (the bulkhead height) is not particularly limited and is determined depending on the amount of active material 36 required (i.e. the design capacity of the battery). For example, the length (depth) of first pores 34 is of the order of 30 to 100 µm.

In the present specification, the porosity of first pores 34 refers to the ratio of the total volume of first pores 34 to the volume of porous structural body 33. There is no particular limitation on the method for measurement of the porosity. The porosity of first pores 34 can be determined from a bulk density and a true density of porous structural body 33. Herein, the term "bulk density" refers to the density of porous structural body 33 taking into account the volume of pores 34 in the material; whereas the term "true density" refers to the theoretical density of the materials of porous structural body 33 without taking into account the volume of pores 34 in the material. The porosity of first pores 34 can alternatively be determined by calculating the volume of first pores from the pore size and length (depth) of first pores 34 and then calculating the ratio of the volume of first pores 34 to the volume of porous structural body 33. It is however necessary, in the case where porous structural body 33 includes fine pores (second pores) other than first pores 34 as will be discussed later, to determine the porosity of first pores 34 in consideration of the volume of the second pores.

Further, the pore size of first pores 34 refers to the average of pore diameters of respective first pores 34 in which active material 36 and conductive fibers 35 are retained. The pore diameter is defined as the absolute maximum length of first pore 34. For example, in FIGS. 4A, 4B, 5A, 5B, 6A and 6B, the dimension "e" corresponds to the pore diameter of first pore 34 in porous structural body 33.

The pore-to-pore width (bulkhead width) of first pores 34 refers to the minimum distance between adjacent first pores 34 (distances between ends of pores 34). For example, in FIGS. 4A, 4B, 5A, 5B, 6A and 6B, the dimension "d2" corresponds to the pore-to-pore width of first pores 34 in porous structural body 33.

The length (depth) of first pores 34 refers to the average length (depth) of first pores 34. For example, in FIGS. 4A, 4B, 5A, 5B, 6A and 6B, the dimension "c" corresponds to the length (depth) of first pores 34 in porous structural body.

There is no particular limitation on the method for measurement of the pore size, the pore-to-pore width and the pore length (depth). For example, the pore size, the pore-to-pore width and the pore length (depth) can be measured by scanning electron microscope (SEM) image analysis.

There is no particular limitation on the form of first pores 34. First pore 34 can be in any form. There is also no particular limitation on the cross sectional profile of first pores 34. The cross sectional profile of first pores 34 can be any specific shape such as circular shape, oval shape, triangular shape, square shape, star shape, cross shape or other polygonal shape, or can be any indefinite shape. These shapes can be used solely or in combination of two or more thereof.

Further, there is no particular limitation on the arrangement pattern of first pores 34. First pores 34 can be in a regular arrangement pattern or in an irregular arrangement pattern. It is preferable that first pores 34 are arranged uniformly in porous structural body 33 in terms of uniform conduction path.

As active material 36 present in first pores 34 of porous structural body 33 absorbs and desorbs lithium ions through the electrolyte layer, it is required that pore 34 has at least one opening at the surface of porous structural body 33. Pore 34 may have one end open (as shown in FIGS. 4A, 4B, 5A and 5B) or may have both ends open, that is, be in the form of a though hole (as shown in FIGS. 6A and 6B). In the case where porous structural body 33 is formed on the surface of collector 31, it is preferable that pore 34 has one end open. In general, a metal foil used as collector 31 has a relatively smooth surface. When conductive fibers 35 are arranged in contact with collector 31, it is unlikely that conductive fibers 35 will entangle with the metal foil to secure electrical contact. By contrast, in the case of using porous structural body 33 in which each of the pores has one end open as shown in FIGS. 4A, 4B, 5A and 5B, conductive fibers 35 comes into contact and entangle with porous structural body 33 rather than collector 31 so as to achieve good electrical contact.

There is no particular limitation on the material of porous structural body 33 as long as it is a conductive material capable of achieving the solid framework structure of porous structural body 33. Preferably, porous structural body 33 contains a conductive particulate material (conductive particles) in order to secure good contact (interaction) with conductive fibers 35 and contribute to weight reduction of electrode 30.

Figure 7:
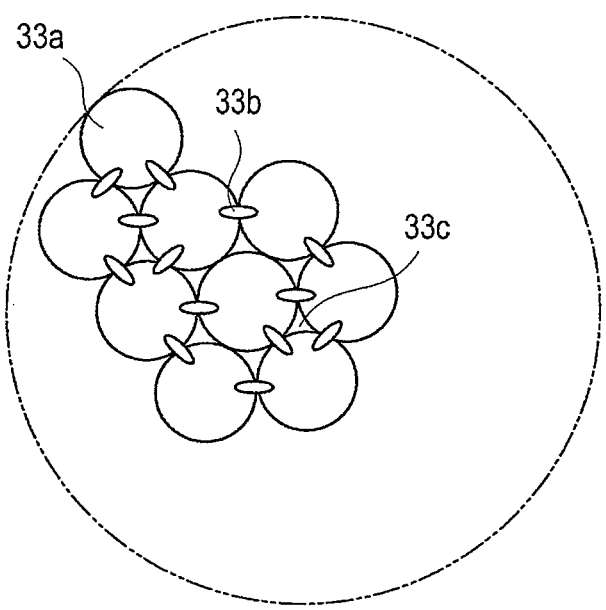
FIG. 7 is a schematic enlarged section view of a porous structural body of the negative electrode for the lithium-ion secondary battery according to the third embodiment of the present invention.

FIG. 7 is a schematic enlarged section view of porous structural body 33. It is preferable that porous structural body 33 contains conductive particles 33a of conductive material and first binder 33b in such a manner that conductive particles 33a are firmly combined by first binder 33b as shown in FIG. 7. Although porous structural body 33 can in fact include any other materials, these materials are herein omitted from the drawing.

In the presence of such conductive particles 33a, porous structural body 33 secure electrical conductivity and make electrical connection to the electrode materials (conductive fibers 35 and active material 36) in first pores 34 and to collector 31.

As shown in FIG. 7, porous structural body 33 can have pores 33c (hereinafter referred to as "second pores") between conductive particles 33a and/or particles of first binder 33b. Second pores 33c refer to those present inside of porous structural body 33 and distinguished from first pores 34 in which the electrode materials such as conductive fibers 35 and active material 36 are filled as mentioned above. By the presence of second pores 33c in porous structural body 33, it is possible that electrode 30 can achieve light weight while maintaining its electrical conductivity and mechanical strength and is also possible to improve the contact (interaction) of porous structural body 33 with conductive fibers 35.

There is no particular limitation on the porosity of second pores 33c as long as porous structural body 33 can secure electrical conductivity and mechanical strength. The porosity of second pores 33 is preferably 30 to 50 volume %. When the porosity of second pores 33c is 30 volume % or more, it is possible for porous structural body 33 to attain good contact (interaction) with conductive fibers filled in first pores 34. It is possible for porous structural body 33 to secure sufficient mechanical strength to maintain its solid framework structure even during charging/discharging when the porosity of second pores 33c is 50 volume % or less.

In the present specification, the porosity of second pores refers to the ratio of the total volume of second pores 33c present in porous structural body 33 to the volume of porous structural body 33. There is no particular limitation on the method for measurement of the porosity. For example, the porosity of second pores 33c can be defined as the porosity of the bulkheads of porous structural body 33 in which first pores 34 are not contained and thus determined from a bulk density of porous structural body 33 and a true density of the materials of porous structural body 33. The porosity of second pores 33c can alternatively be determined by determining the volume of pores 33c (fine pores) present in porous structural body 33 by pore size distribution measurement according to mercury intrusion method and then calculating the ratio of the volume of second pores 33c to the volume of porous structural body 33. In this case, the porosity of first pores 34 can be determined by subtracting the porosity of second pores 33c from the total porosity of porous structural body 33. Namely, the porosity of first pores 34 and the porosity of second pores 33c can be determined by the following formulas in the case where porous structural body 33 has second pores 33c.

Porosity of all pores (volume %) =

$$\left\{1 - \frac{\text{Bulk density of porous structual body (g/cm}^3)}{\text{True density of materials of porous structual body (g/cm}^3)}\right\} \times 100 =$$

$$\frac{\text{Volume of pores in porous structual body (cm}^3)}{\text{Volume of porous structual body (cm}^3)} \times 100$$

Porostiy of first pores (volume %) =
$$\{1 - \text{Porosity of second pores (volume \%)}\} \times 100$$

Porosity of second pores (volume %) =

$$\left\{1 - \frac{\text{Bulk density of bulkheads of porous structual body (g/cm}^3)}{\text{True density of materials of bulkheads of porous structual body (g/cm}^3)}\right\} \times$$

$$100 = \frac{\text{Volume of second pores in bulkheads of porous structural body (cm}^3)}{\text{Volume of bulkheads of porous structural body (cm}^3)} \times 100$$

There is no particular limitation on the pore size (fine-pore size) of second pores 33c. The pore size of second pores 33c is preferably 0.1 to 10 µm, more preferably 1 to 10 µm. When the pore size of second pores 33c is in the above range, it is possible to secure the mechanical strength of porous structural body 33 and to prevent the entry of the electrode materials such as active material 36 into second pores 33c.

In the present specification, the pore size of second pores 33c refers to the average of pore diameters of respective second pores 33c. The pore diameter is defined as the absolute maximum length of second pore 33c. There is no particular limitation on the method for measurement of the pore size of second pores 33c. For example, the pore size of second pores 33c can be determined by pore size distribution measurement according to mercury intrusion method.

There is no particular limitation on the form of second pores 33c. Second pores 33c can be in any form as in the case of first pores 34.

Examples of the conductive material include carbon materials and metal materials. In particular, carbon materials are preferred as the conductive material. The electrical resistance of porous structural body 30 can be limited to a low level by the use of the carbon material as the conductive material. Further, the use of the carbon material is advantageous for weight reduction of electrode 30 as the carbon material has a low specific gravity. It is also considered that, in the case of using the particulate conductive material as in the present embodiment, the carbon material (carbon particles) shows lower contact resistance due to good particle-to-particle contact than that of the metal material (metal particles).

As the conductive material, there can suitably be used carbon blacks and graphites. In terms of good electron conductivity and large specific area, preferred are carbon blacks such as Acetylene Black, Ketjen Black, Oil Furnace Black, Channel Black, Lamp Black and Thermal Black and graphites such as carbon graphite (flake graphite) and expandable graphite. The carbon material can be selected from commercially available products. Examples of such commercially available carbon materials include: carbon black available from Cabot Corporation under the trade name of Vulcan XC-72, Vulcan P, Black Pearls 880, Black Pearls 1100, Black Pearls 1300, Black Pearls 2000 or Regal 400: Ketjen Black EC available from Lion Corporation; Oil Furnace Black available from Mitsubishi Chemical Corporation under the trade name of #3150 or #3250; and Acetylene Black available from Denki Kagaku Kogyo Kabushiki Kaisha under the trade name of Denka Black. There can also be used natural graphites, artificial graphites obtained from organic compounds such as pitch, coke, polyacrylonitrile, phenol resin and furan resin and carbon. Further, the carbon material may be subjected to graphitization etc. for improvement in corrosion resistance.

As the metal material, there can be used: iron, titanium, aluminum, copper and alloys thereof; stainless steel; and noble metals such as gold and silver. Among others, preferred are those capable of withstanding the charge/discharge potential of the battery. The metal material preferably contains copper in the case of use in negative electrode 30 although the metal material preferably contains aluminum in the case of use in positive electrode.

These conductive materials can be used solely or in combination of two or more thereof.

There is no particular limitation on the particle size of the conductive particulate material (conductive particles) as long as the conductive particulate material is capable of securing electrical contact and mechanical strength. The particle size of the conductive particles is preferably 0.2 to 5 μm, more preferably 0.3 to 1 μm. When the particle size of the conductive particles is 5 μm or smaller, it is possible to attain surface smoothness and limit increase in contact resistance. It is possible to attain good handling when the particle size of the conductive particles is 0.2 μm or larger. There is also no particular limitation on the form of the conductive particles. The conductive particles can be in any form such as spherical form, rod form, needle form, plate form, columnar form, indefinite form, flake form or spindle form. The particle size of the conductive material can be herein given in the unit of a D50 value (median diameter) as determined by laser diffraction scattering.

The amount of conductive material 33a in porous structural body 33 is preferably 60 to 95 mass %, more preferably 70 to 90 mass %, based on the total mass of porous structural body 33. It is possible to secure good conductivity and obtain reduction in contact resistance when the amount of conductive material 33a in porous structural body 33 is 60 mass % or more. When the amount of conductive material 33a in porous structural body 33 is 95 mass % or less, it is possible to provide porous structural body 33 with strong mechanical strength.

First binder 33b is added to combine the conductive particles together for the formation of porous structural body 33 and is distinguished from the after-mentioned second binder, which is added as the electrode material into pores 34 of porous structural body 33.

There is no particular limitation on first binder 33b. Examples of first binder 33b include: fluoro polymers such as polytetrafluoroethylene (PTFE), polyhexafluoropropylene and tetrafluoroethylene-hexafluoropropylene copolymer (FEP); thermosetting resins such as epoxy resin, polyurethane resin, urea resin, phenol resin, melamine resin and polyamide resin; thermoplastic resins such as polyvinylidene fluoride (PVdF), polyvinyl acetate, polyimide (PI), polyamide (PA), polyvinyl chloride (PVC), polymethylacrylate (PMA), polymethylmethacrylate (PMMA), polyether nitrile (PEN), polyethylene (PE), polypropylene (PP) and polyacrylonitrile (PAN); rubber materials such as styrene-butadiene rubber (SBR). Among others, polyvinylidene fluoride (PVdF) and polyimide (PI) are preferred as these polymers can be each uniformly dispersed and readily prepared into a slurry during manufacturing. The above binders can be used solely or in combination of two or more thereof. There can also be used any other polymer materials.

The amount of first binder 33b in porous structural body 33 is preferably 5 mass % or more, more preferably 5 to 40 mass %, still more preferably 10 to 30 mass %, based on the total mass of porous structural body 33. It is possible to combine the particles favorably and provide porous structural body 33 with strong mechanical strength when the amount of first binder 33b in porous structural body 33 is 5 mass % or more. On the other hand, in view of the fact that a binder material generally exhibits insulation properties, it is desirable to minimize the amount of first binder 33b in porous structural body 33 as long as mechanical strength can be secured. When the amount of first binder 33b in porous structural body 33 is 40% or less, it is possible to limit increase in contact resistance and secure good conductivity.

Although porous structural body 33 is formed of fine particles such as conductive particles 33a and first binder 33b in FIG. 7, the structure of porous structural body 33 is not limited to that of FIG. 7 as long as porous structural body 33 can secure electrical conductivity and mechanical strength. For example, porous structural body 33 may be formed of any fibrous conductive material. As such a fibrous conductive material, there can be used carbon fibers and metal fibers prepared from the above carbon materials and metal materials. There can alternatively be used porous metal. Further, porous structural body 33 may contain any component or components other than the conductive material and first binder. The amount of the other component in the porous structural body is not particularly limited and is adjusted as appropriate within the range that does not affect the effects of the present invention.

[Negative Electrode Active Material Layer]

Negative electrode active material layer 32 contains negative electrode active material 33 and may optionally contain a second binder, a conductive material for improvement in electrical conductivity, an electrolyte material (polymer matrix, ion conductive polymer, electrolyte solution), an electrolyte support salt (lithium salt) for improvement in ion conductivity and the like. The electrode materials such as conductive fibers 35 and negative electrode active material 36 are incorporated in first pores 34 of porous structural body 33, thereby forming negative electrode material layer 32.

The filling rate of the electrode materials in first pores 34 is preferably 50 to 70 volume %, more preferably 60 to 70 volume %. When the electrode material filling rate is in the above range, it is possible to secure sufficient space (void) in which active material 36 expands and contracts, effectively limit volume expansion of electrode 30 (notably, alloy component) during absorption and desorption of lithium and thereby prevent deformation or destruction of the electrode structure.

In the present specification, the filling rate of the electrode materials in first pores 34 refers to the ratio of the total volume of the electrode materials to the total volume of first pores 34 of porous structural body 33. There is no particular limitation on the method for measurement of the filling rate. For example, the filling rate of the electrode materials in first pores 34 can be determined by the following formula from the above-determined porosity of first pores 34, the bulk density and true density of the electrode materials and the volume of porous structural body 33.

$$\text{Filling rate of electrode materials in first pores (volume \%)} = \left\{ \frac{\text{Bulk density of electrode materials (g/cm}^3)}{\text{True density of electrode materials (g/cm}^3)} \times \frac{\text{Volume of porous structual body (cm}^3)}{\text{Porosity of first pores (volume \%)}} \right\} \times 100 = \frac{\text{Volume of electrode materials (cm}^3)}{\text{Volume of first pores (cm}^3)} \times 100$$

[Negative Electrode Active Material]

There is no particular limitation on negative electrode active material 36 as long as it is capable of reversibly absorbing and desorbing lithium. Any known negative electrode active materials can be used. Among others, it is preferable to use a carbon material and/or a lithium-alloying material. Each of the carbon material and the lithium-alloying material shows a large volume expansion during charging/discharging of the battery. The effects of the present invention are thus more pronounced when the carbon material or lithium-alloying material is used. Detailed explanations of the kind of negative electrode active material 36 will be omitted as negative electrode active material 36 of the present embodiment can be the same as negative electrode active material 3a of the above-mentioned first and second embodiments.

The negative electrode active material can be used solely or in combination of two or more kinds thereof.

In order to exert the pronounced effects of the present invention, the amount of the carbon material and/or lithium-alloying material in negative electrode active material 36 is preferably 50 mass % or more, more preferably 80 mass % or more, still more preferably 90 mass % or more, especially preferably 100 mass %.

There is no particular limitation on the particle size of negative electrode active material 36. The particle size of negative electrode active material 36 is preferably 1 to 100 µm, more preferably 1 to 20 µm, in terms of high capacity, reactivity and cycle resistance. When the particle size of negative electrode active material 36 is in the above range, it is possible to limit increase in the internal resistance of the battery during charging/discharging cycles under high-output conditions and take out sufficient electric current from the battery. Herein, the particle size of negative electrode active material 36 can be given in the unit of a median diameter as determined by laser diffraction.

Further, negative electrode active material 36 can be in any of various forms such as spherical (powder) form, plate form, needle form, columnar form and horn form.

The amount of use (the filling amount) of negative electrode active material 36a is preferably 60 to 95 mass %, more preferably 70 to 90 mass %, based on the total mass (100 mass %) of the electrode materials retained in pores 34 of porous structural body 33. When the amount of use of negative electrode active material 36a is 60 mass % or more, it is possible to secure sufficient battery capacity. It is possible to prevent destruction of porous structural body 33 or poor electrical contact with conductive fibers 35 caused by to expansion and contraction of negative electrode active material 36a when the amount of use of negative electrode active material 36a is 95 mass % or less.

(Second Binder)

The second binder is added to combine active material 36 together or combine active material 36 and conductive fibers 35 together and thereby maintain the electrode structure and is distinguished from the first binder, which is added as the constituent of porous structural body 33. Active material 36, or active material 36 and conductive fibers 35, can be firmly combined together by the second binder so as to maintain electrical contact even when active material 36 expands and contracts. It is thus possible to limit increase in electrode resistance for improvements in battery cycle characteristics.

There is no particular limitation on the second binder. The same materials as the first binder can suitably be used as the second binder.

The amount of use (i.e. the filling amount) of the second binder is preferably 1 to 20 mass %, more preferably 1 to 10 mass %, based on the total mass (100 mass %) of the electrode materials retained in pores 34 of porous structural body 33. When the amount of use of the second binder is 1 mass % or more, it is possible to sufficiently combine active material 36 or combine active material 36 and conductive fibers 35 together and maintain good particle-to-particle electrical contact (conduction network) even during repeated charge/discharge cycles of the battery. On the other hand, in view of the fact that a binder material generally exhibits insulation properties, it is desirable to minimize the amount use of the second binder as long as mechanical strength can be secured. When the amount of use of the second binder is 10% or less, it is possible to not only limit increase in contact resistance but also fill a sufficient amount of active material and thereby prevent deterioration in battery capacity.

(Conductive Material)

There is no particular limitation on the conductive material. Any known conductive material can be used as appropriate. Detailed explanations of the kind of the conductive material will be omitted as the conductive material of the present embodiment can be the same as those of the above-mentioned first and second embodiments. When the conductive material is contained in active material layer 32 in addition to conductive fibers 35, it is possible to form an electron network effectively in active material layer 32 so as to contribute to improvement in battery output performance. There is also no particular limitation on the amount of the conductive material contained. The amount of the conductive material is adjusted as appropriate in the light of any knowledge about lithium-ion secondary batteries.

(Electrolyte Material/Support Salt)

There is no particular limitation on the electrolyte material as long as the electrolyte material functions as a lithium-ion carrier. For example, liquid electrolytes and polymer electrolytes can be used. There is also no particular limitation on the support salt (lithium salt). Organic acid anion salts can be used. As the electrolyte material and the support salt can be the same as those of the after-mentioned electrolyte layer, detailed explanations of the kinds of the electrolyte material and the support salt will be omitted. Each of the electrolyte material and the support salt may be used solely or in combination of two or more kinds thereof.

There is also no particular limitation on the amounts of the electrolyte material and the support material contained. The amounts of the electrolyte material and the support salt are adjusted as appropriate in the light of any knowledge about lithium-ion secondary batteries.

[Conductive Fibers]

Conductive fibers 35 have the function of supporting negative electrode active material 36 and electrically connecting and elastically linking porous structural body 33 and negative electrode active material 36 to each other. Conductive fibers 35 can follow movements of active material 36 to form a strong conductive network between active material 36 and between active material 36 and porous structural body 33. Herein, the term "follow" means to respond to positional displacement of active material 36 by flexible deformation (bending) of conductive fibers 35. The following movements of conductive fibers 35 allows active material 36, when it loses contact with one specific conductive fiber 35, to be held in contact with any other adjacent conductive fiber 35. By this, it is possible to, even when active material 36 shows a large expansion and contraction, secure conduction path in electrode 30 and limit increase in resistance during repeated charge/discharge cycles of the battery.

In FIGS. 4A, 4B, 5A, 5B, 6A and 6B, conductive fibers 35 constitutes a three-dimensional network structure in first pores 34 of porous structural body 33 so that active material 36 exists in such a three-dimensional network structure. It is possible by such a configuration that conductive fibers 35 can form conduction path uniformly throughout electrode layer 32 and attain good electrical contact with active material 36 and porous structural body 33 for further improvements in battery output and cycle characteristics. It is also possible that conductive fibers 35 can follow volume expansion of active material 36 when active material 36 absorbs and desorbs lithium. The form of conductive fibers 35 in first pores 34 of porous structural body 33 is not however limited to the above. For example, two-dimensional network sheets of conductive fibers 35 may be arranged regularly or irregularly. One-dimensional conductive fibers 35 may alternatively be arranged regularly or irregularly.

There is no particular limitation on conductive fibers 35 as long as conductive fibers 35 are capable of following movements of active material 36 and showing electrical conductivity. For example, conductive fibers 35 can be at least one kind selected from the group consisting of carbon fiber materials, metal fiber materials and organic fiber materials. Among others, carbon fiber materials are preferred for reduction in contact resistance with porous structural body 33.

Preferably, at least one kind selected from the group consisting of carbon fibers, carbon nanotubes and carbon nanohorns is used as the carbon fiber material. These carbon fiber materials can easily form a three-dimensional network structure so as to maintain the distance between active material 36 and improve the electrical conductivity of electrode 30. Further, these materials have good flexibility so as to effectively relieve volume expansion of active material 36 caused by lithium absorption/desorption. Examples of the carbon fibers include PAN-based carbon fibers, pitch-based carbon fibers and vapor grown carbon fibers. The PAN-based carbon fibers refer to those obtained using synthetic fibers predominantly composed of PAN as raw material; and the pitch-based carbon fibers refer to those obtained using petroleum, coal, synthetic pitch and the like as raw material. As the carbon fibers have high specific strength and specific modulus, it is possible to improve the flexibility and strength of electrode layer 32 for more stable electrode structure by the use of the carbon fibers.

As the metal fiber material, there can be used fibers of iron, titanium, aluminum, copper and alloys thereof, stainless steel and noble metals such as gold and silver. These metal fiber materials have higher electrical conductivity. Among others, preferred are fibers of stainless steel, aluminum and aluminum alloy in terms of mechanical strength, general versatility, cost efficiency, ease of processing and high electrical conductivity.

The organic fiber material refers to electrically conductive resin fibers. There can be used phenol resin fibers, polyacrylonitrile fibers, polyethylene terephthalate fibers and polybutylene terephthalate fibers. Among others, preferred are phenol resin fibers for more assured electrical conductivity.

There is no particular limitation on the length of conductive fibers 35. The length of conductive fibers 35 is preferably longer than or equal to 10 µm and shorter than or equal to the pore size of first pores 34 of porous structural body 33. When the length of conductive fibers 35 is 10 µm or longer, it is possible to secure good electrical contact between active material 36 and porous structural body 33. It is possible to easily fill conductive fibers 35 in first pores 34 when the length of conductive fibers 35 is shorter than or equal to the pore size of first pores 34 of porous structural body 33.

There is also no particular limitation on the fiber diameter of conductive fibers 35. The fiber diameter of conductive fibers 35 is preferably of the order of 100 nm to 10 µm. It is possible to secure good dispersibility when the fiber diameter of conductive fibers 35 is 100 nm or more. When the fiber diameter of conductive fibers 35 is 10 µm or less, the stiffness of conductive fibers 35 do not become too high so that conductive fibers 35 can favorably follow expansion and contraction of active material 33.

The amount of use (the filling amount) of conductive fibers 35 is preferably 5 to 40 mass %, more preferably 10 to 40 mass %, based on the total mass (100 mass %) of the electrode materials retained in pores 34 of porous structural body 33. When the amount of use of conductive fibers 35 is 5 mass % or more, it is possible to secure good electrical contact between active material 36 and porous structural body 33. It is possible to fill sufficient active material 36 and thereby prevent deterioration in battery capacity when the amount of use of conductive fibers 35 is 40 mass % or less.

[Collector]

There is no particular limitation on the material and structure of collector 31 as long as collector 31 is capable of electrically connecting negative electrode active material layer 32 to any external member. Collector 31 can adopt any form conventionally known and commonly used for lithium-ion secondary batteries. As the material of collector 31, there can be used the same conductive metal material as that of collector 2 of the first embodiment. Among others, copper is particularly preferred. Further, there can be used a foil structure, a nonwoven fabric structure, a porous structure or a plate structure as the structure of collector 31. The thickness of collector 31 is generally 10 to 20 µm. However, collector 31 whose thickness is out of the above range can be used. The size of collector 31 is determined depending on the purpose of use of the lithium-ion secondary battery.

[Production Method of Negative Electrode]

There is no particular limitation on the production methods of negative electrode 30 of the third embodiment. The production method of negative electrode 30 according to one exemplary embodiment of the present invention includes: (1) a step of providing porous structural body 33 with pores 34; (2) a step of preparing an active material slurry by mixing active material 36 and conductive fibers 35 together; and (3) a step of applying and drying the active material slurry into pores 34 of porous structural body 33.

(1) Step of Providing Porous Structural Body

First, provided is porous structural body 33 that exhibits electrical conductivity and have pores 34. It is feasible to use as porous structural body 33 a commercially available porous structural body as it is, or to produce porous structural body 33 by any known process.

For example, porous structural body 33 can be produced by: (a) preparing a porous structural body material slurry by mixing conductive material 33a and first binder 33b together; (b) applying and drying the porous structural body material slurry onto a surface of a substrate, thereby forming a conductive layer; and (c) forming pores in the conductive layer.

(a) Preparation of Porous Structural Body Material Slurry

First, the porous structural body material slurry is prepared by dispersing the porous structural body materials such as conductive material 33a and first binder 33b into a slurry viscosity adjusting solvent.

There is no particular limitation on the slurry viscosity adjusting solvent. Examples of the slurry viscosity adjusting solvent include N-methyl-2-pyrrolidone (NMP), dimethylformamide, dimethylacetoamide and methylformamide. The slurry is generally formed into an ink from the solvent and solid matter by means of a homogenizer or mixer.

There is also no particular limitation on the order of mixing and dispersing the porous structural body materials such as conductive material 33a, binder 33b and optionally other additives. These porous structural body materials may be mixed and dispersed at one time or step by step depending on the kinds of the material components.

(b) Application and Drying

The above-prepared porous structural body material slurry is applied to the surface of substrate 38, followed by drying the resulting coating to volatilize the solvent from the coating. With this, conductive layer 37 is formed from the porous structural body material on the surface of substrate 38 (see Step 1 of FIG. 8A, 8B).

There is no particular limitation on the means for applying the porous structural body material slurry to the substrate. Any ordinary means such as self-running coater, doctor blade process, spraying process, ink jet process or the like can be adopted.

There is also no particular limitation on the material of the substrate. Preferably, collector 31 is used as the substrate. In the case of using collector 31 as the substrate, the coating of the porous structural body materials is formed on collector 31 so that porous structural body 33 is defined on the surface of collector 31 in the subsequent pore forming step. In this case, the laminate of collector 31 and porous structural body 33 is preferably used as it is for manufacturing of the battery. It is alternatively feasible to use any material other than collector 31 as the substrate. For example, a resin sheet such as a sheet of Teflon (trademark) may be used as the substrate and coated with the porous structural body material slurry. Porous structural body 33 is obtained by, after the subsequent drying treatment and pore formation step, peeling off the resin sheet from the conductive layer.

(c) Formation of Pores

The pores (first pores 34) are formed in the above-obtained conductive layer. There is no particular limitation on the means for forming the pores. The pores can be formed by screen printing process, sandblasting process or the like. FIG. 8A is a schematic view showing the step of producing porous structural body 33 by screen printing process. FIG. 8B is a schematic view showing the step of producing porous structural body 33 by sandblasting process.

In the case of the screen printing process of FIG. 8A, the porous structural body material slurry prepared in the above porous structural body material slurry preparation step (a) is applied and dried onto the surface of conductive layer 37 through a patterned screen printing plate (not shown) to thereby form bulkheads 39 in a desired pattern on the surface of conductive layer 37 (see Step 2 of FIG. 8A). Porous structural body 33 is then obtained by peeling off substrate 38 as needed (see Step 3 of FIG. 8A).

In the case of the sandblasting process of FIG. 8B, the surface of conductive layer 37 is subjected to sand blasting through a mask pattern (not shown) to thereby form pores 34 in a desired pattern in the surface of conductive layer 37 (see Step 2 of FIG. 8B). Porous structural body 33 is then obtained by peeling off substrate 38 as needed (see Step 3 of FIG. 8B).

(2) Step of Preparing Active Material Slurry

The active material slurry is prepared by dispersing the electrode materials such as active material 36, conductive fiber 35 and optionally binder (second binder), conductive material, electrolyte material etc. into a slurry viscosity adjusting solvent.

At this time, the filling rate of the electrode materials in first pores 34 of porous structural body 33 can be controlled to within the desired range by adjusting the amount of use of the slurry viscosity adjusting solvent. More specifically, the filling rate of the electrode materials in first pores 34 of porous structural body 33 can be decreased by increasing the amount of use of the slurry viscosity adjusting solvent. The slurry viscosity adjusting solvent is thus used in such an amount that the filling rate of the electrode materials in first pores 34 of porous structural body 33 falls within the desired rage. By way of example, the amount of use of the slurry viscosity adjusting solvent is preferably 20 to 80 mass % based on the total mass (100 mass %) of the electrode materials.

In the preparation of the active material slurry, a surfactant may be added so as to improve the dispersibility of the electrode materials such as active material and conductive fibers. In this case, it is feasible to remove the surfactant by washing with an alcohol solvent such as ethanol after the subsequent electrode production step.

There is no particular limitation on the slurry viscosity adjusting solvent. Examples of the slurry viscosity adjusting solvent of the active material slurry are the same as those of the porous structural body material slurry. There is also no particular limitation on the order of mixing and dispersing the electrode materials such as active material, conductive fiber and optionally binder (second binder), conductive material, electrolyte material etc. These electrode materials may be mixed and dispersed at one time or step by step depending on the kinds of the material components.

(3) Step of Applying and Drying Active Material Slurry

The above-prepared active material slurry is applied into first pores 34 of porous structural body 33. There is no particular limitation on the means for applying the active material slurry. Any ordinary means such as self-running coater, doctor blade process, spraying process, ink jet process or the like can be adopted.

The active material slurry filled in first pores 34 of porous structural body 33 is then dried to remove the solvent from the active material slurry. There is also no particular limitation on the means for drying the active material slurry. The drying means can be selected as appropriate in the light of any knowledge about electrode production. For example, the active material slurry can be dried by heating treatment. The drying conditions (drying time, drying temperature etc.) can also be set as appropriate depending on the amount of the slurry applied and the volatilization speed of the slurry viscosity adjusting solvent.

It is possible by such a simple method to produce electrode 30 with good durability.

[Lithium-Ion Secondary Battery]

A lithium-ion secondary battery according to the present invention includes at least one of negative electrodes 1, 1' and 30. There is no particular limitation on the structure and form of the lithium-ion secondary battery of the present invention. The lithium-ion secondary battery can adopt any known structure. For example, the lithium-ion secondary battery of the present invention may be of bipolar type or non-bipolar type, and may be of laminated (flat) structure or winding (cylindrical) structure.

Figure 9:
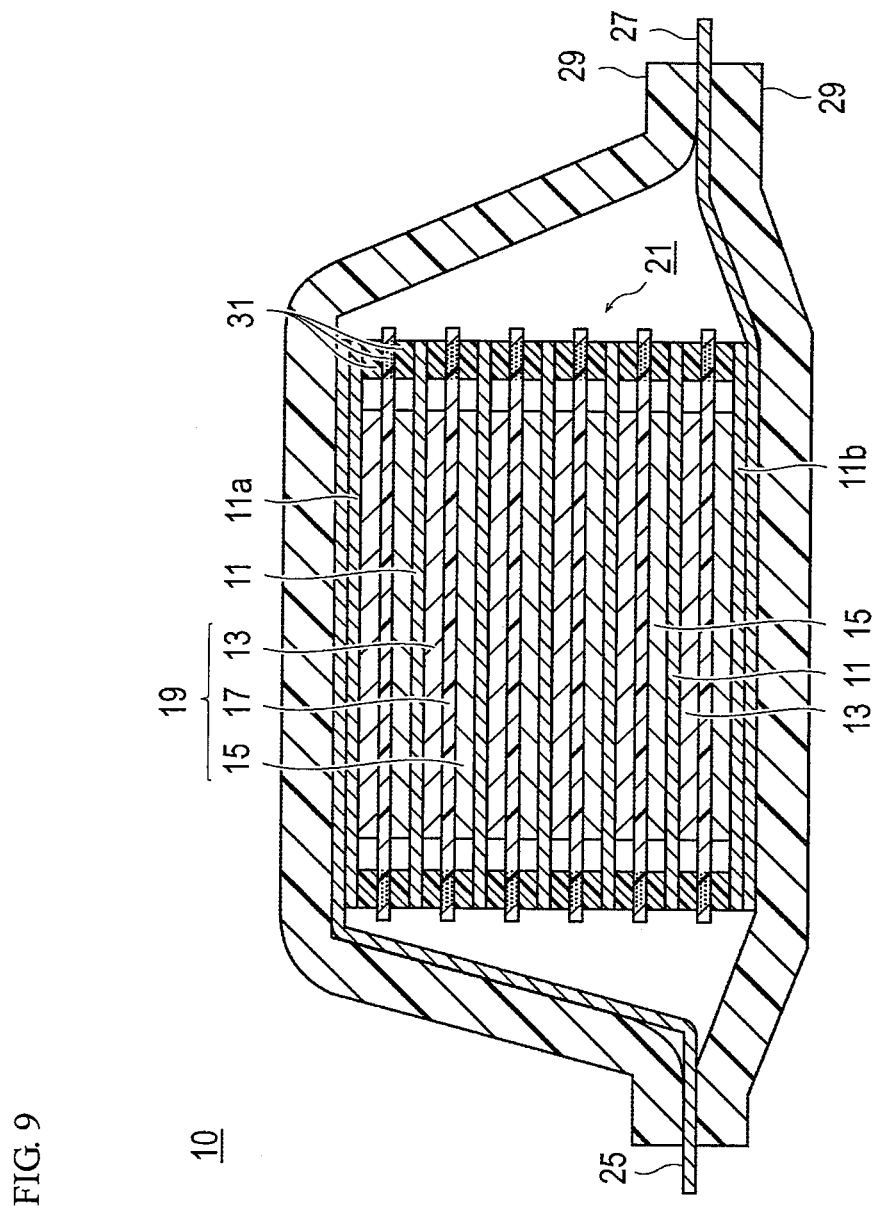
FIG. 9 is a section view of a lithium-ion secondary battery according to one embodiment of the present invention.

FIG. 9 is a section view of bipolar battery 10 as one example of the lithium-ion secondary battery according to the present invention. As shown in FIG. 9, bipolar battery 10 has substantially rectangular battery element 21, which actually undergoes a charge/discharge reaction, sealed in a battery package of laminate films 29.

Battery element 21 includes a plurality of bipolar electrodes and electrolyte layers 17. Each of the bipolar electrodes has collector 11, positive electrode active material layer 13 electrically connected to one side of collector 11 and negative electrode active material layer 15 electrically connected to the other side of collector 11. Each of electrolyte layers 17 has a separator (as a substrate medium) and an electrolyte material retained in a planar center portion of the separator. The bipolar electrodes and electrolyte layers 17 are alternately laminated on each other in such a manner that positive electrode active material layer 13 of either one of the bipolar electrodes faces negative electrode active material layer 15 of any other one of the bipolar electrodes adjacent to the aforementioned either one of the bipolar electrodes via electrolyte layer 17. In other words, electrolyte layer 17 is arranged between positive electrode active material layer 13 of the either one of the bipolar electrodes and negative electrode active material layer 15 of the any other one of the bipolar electrodes adjacent to the aforementioned either one of the bipolar electrodes.

As these adjacently located positive electrode active material layer 13, electrolyte layer 17 and negative electrode active material layer 15 constitute unit cell 19, it can be said that bipolar battery 10 has a laminated structure of a plurality of unit cells 19.

In order to prevent the occurrence of a liquid junction due to electrolyte solution leakage from electrolyte layer 17, seal portion 31 is arranged at an outer periphery of unit cell 19. The arrangement of such seal portion 31 is also effective in providing insulation between adjacent collectors 11 and preventing short circuit caused by contact between adjacent electrodes.

Outermost collector 11*a* is located as a positive-electrode-side outermost layer of battery element 21. Positive electrode active material layer 13 is formed only on one side of outermost collector 11*a*. Further, outermost collector 11*b* is located as a negative-electrode-side outermost layer of battery element 21. Negative electrode active material layer 15 is formed only on one side of outermost collector 11*b*. Alternatively, positive electrode active material layers 13 may be formed on both sides of positive-electrode-side outermost collector 11*a*; and negative electrode active material layer 15 may be formed on both sides of negative-electrode-side outermost collector 11*b*.

Bipolar battery 10 also has positive electrode collector plate 25 located adjacent to positive-electrode-side outermost collector 11*a* and led out from laminate films 29 and negative electrode collector plate 27 located adjacent to negative-electrode-side outermost collector 11*b* and led out from laminate films 29.

Figure 10:
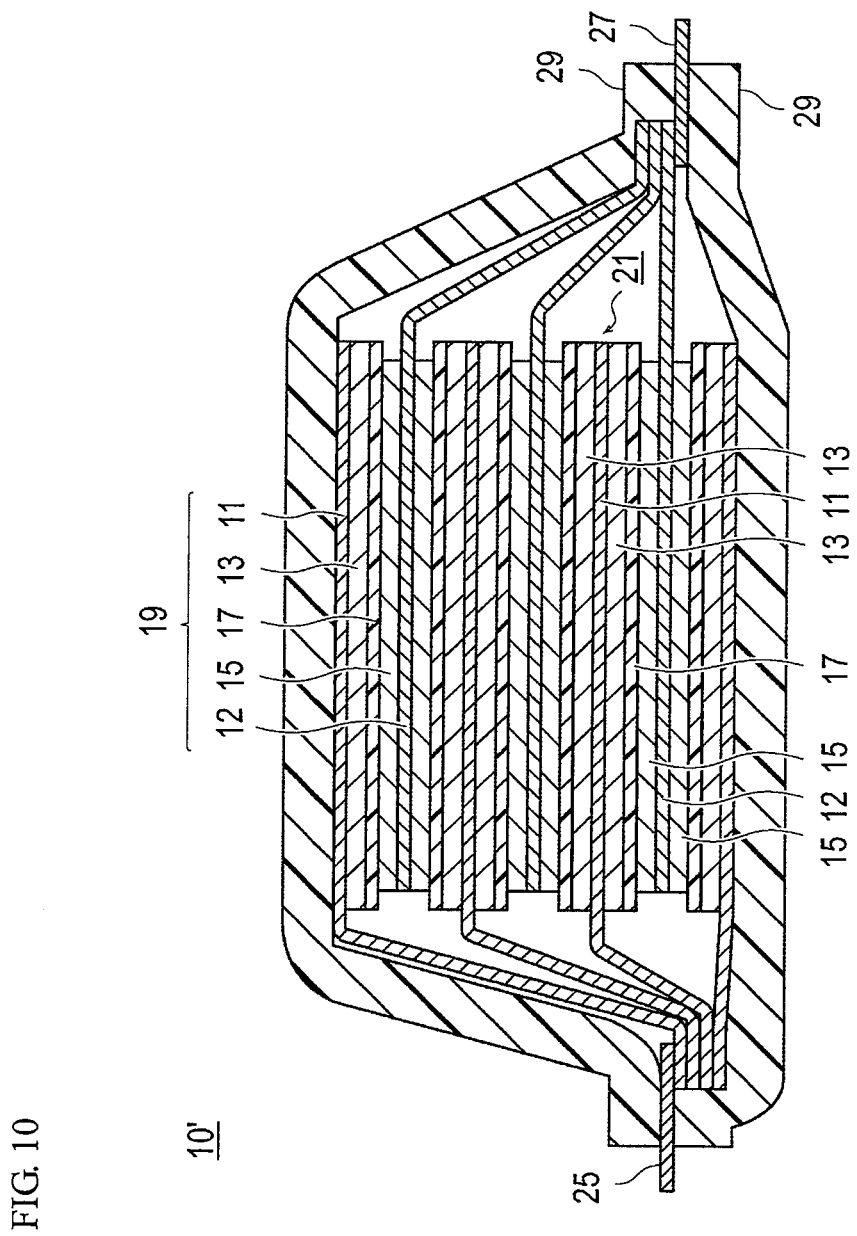
FIG. 10 is a section view of a lithium-ion secondary battery according to another embodiment of the present invention.

FIG. 10 is a section view of non-bipolar laminated battery 10' (occasionally simply referred to as "laminated battery") as another example of the lithium-ion secondary battery according to the present invention. As shown in FIG. 10, laminated battery 10' has substantially rectangular battery element 21, which actually undergoes a charge/discharge reaction, sealed in a battery package of laminate films 29.

Battery element 21 includes a plurality of positive and negative electrodes and electrolyte layers 17. Each of the positive electrodes has positive electrode collector 11 and positive electrode active material layers 13 formed on both sides of positive electrode collector 11. Each of the negative electrodes has negative electrode collector 12 and negative electrode active material layers 15 formed on both sides of negative electrode collector 12. The positive electrodes, electrolyte layers and negative electrodes are alternately laminated on each other in this order in such a manner that either one of the positive electrodes faces any one of the negative electrodes adjacent to the aforementioned either one of the positive electrodes via electrolyte layer 17.

As these adjacently located positive electrode, electrolyte layer and negative electrode constitute one unit cell 19, it can be said that laminated battery 10' has a laminated structures of a plurality of unit cells 19 electrically connected in parallel.

Outermost positive electrode collectors are located as both outermost layers of battery element 21. Positive electrode active material layer 13 is formed only on one side of each outermost positive electrode collector. The arrangement of the positive and negative electrodes may be reversed from that of FIG. 10 such that: outermost negative electrode collectors are located as both outermost layers of battery element 2; and negative electrode active material layer is formed only on one side of each outermost negative electrode collector.

Laminated battery 10' also has positive and negative electrode collector plates 25 and 27 attached to positive and negative electrode collectors 11 and 12, respectively, for electrical conduction to the respective electrodes (positive and negative electrodes). These collector plates (25, 27) are sandwiched between ends of laminated films 29 and led out from laminate films 29. Positive and negative electrode collector plates 25 and 27 may be fixed by ultrasonic welding, resistance welding etc. to positive and negative electrode collectors 11 and 12 via positive and negative leads (not shown) as needed.

Each of negative electrodes 1, 1' and 30 of the above-mentioned embodiments can suitably be used as at least one of the negative electrodes in bipolar battery 10 of FIG. 9 or as at least one of the negative electrodes in laminated battery 10' of FIG. 10. In general, the negative electrode active material shows a large expansion and contraction during charge/discharge cycle of the battery. The effects of the present invention are more pronounced in the negative electrode containing such a negative electrode active material (notably, the electrode in which the active material has a volumetric expansion coefficient of 5 volume % or higher during charging/discharging).

The battery structural parts, other than the negative electrode, will be briefly explained below.

[Positive Electrode]

Positive electrode active material layer 13 contains a positive electrode active material and may optionally contain any other additive or additives as needed. Detailed explanations of the component materials other than the positive electrode active material of positive electrode active material layer13 will be omitted as these other positive electrode materials are the same as those mentioned above and used for negative electrode active material layer 15. There is no particular limitation on the compounding ratio of the component materials of positive electrode active material layer 13 and the thickness of positive electrode active material layer13. The component material compounding ratio and thickness of positive electrode active material layer13 are adjusted as appropriate in the light of any knowledge about lithium-ion secondary batteries.

There is no particular limitation on the positive electrode active material as long as it is capable of absorbing and desorbing lithium. There can be used any positive electrode active materials commonly used for lithium-ion secondary batteries. Preferred are lithium-transition metal composite oxides. Examples of the lithium-transition metal composite oxide include: lithium-manganese composite oxide such as $LiMn_2O_4$;

lithium-nickel composite oxide such as $LiNiO_2$; lithium-nickel-manganese composite oxide such as $LiNi_{0.5}Mn_{0.5}O_2$; lithium-cobalt composite oxide such as $LiCoO_2$; lithium-nickel-cobalt composite oxide such as $LiNi_{0.8}CO_{0.2}O_2$; lithium-iron composite oxide such as $LiFeO_2$; lithium-transition metal phosphate compound ($LiFePO_4$ etc.); and lithium-transition metal sulfate compound ($Li_xFe_2(SO_4)_3$ etc.). In some cases, two or more of these positive electrode active materials may be used in combination.

The positive electrode can be so configured that at least part of the positive electrode active material is electrically connected to and elastically linked to the surface of the conductive substrate (such as collector, porous structural body or the like) by a conductive member as in the case of negative electrodes 1, 1' and 30. In the case where the positive electrode has the same configuration as that of negative electrode 30, the amount of use (the filling amount) of the positive electrode active material is preferably 60 to 95 mass %, more preferably 70 to 90 mass %, based on the total mass (100 mass %) of the electrode materials retained in pores 34 of porous structural body 33. When the amount of use of the positive electrode active material is 60 mass % or more, it is possible to secure sufficient battery capacity. It is possible to prevent destruction of the porous structural body or poor electrical contact with the conductive fibers caused by to expansion and contraction of the positive electrode active material when the amount of use of the positive electrode active material is 95 mass % or less.

There is no particular limitation on the shape and size of the positive electrode active material. The positive electrode active material can be in various particulate forms such as spherical (powder) form, plate form, needle form, columnar form and horn form.

In this case, the particle size of the positive electrode active material is preferably 1 to 100 μm, more preferably 1 to 20 μm, in terms of high capacity, reactivity and cycle resistance. When the particle size of the positive electrode active material is in the above range, it is possible to limit increase in the internal resistance of the battery during charging/discharging cycles under high-output conditions and take out sufficient electric current from the battery. Herein, the particle size of the positive electrode active material can be given in the unit of a median diameter as determined by laser diffraction.

[Electrolyte Layer]

Electrolyte layer 17 functions as a spatial bulkhead (spacer) between the positive and negative electrode active material layers and also has the function of containing and retaining therein a non-aqueous electrolyte material as a lithium-ion carrier between the positive and negative electrodes during charging/discharging of the battery.

There is no particular limitation on the non-aqueous electrolyte material. Liquid electrolytes and polymer electrolytes can suitably be used.

The liquid electrolyte is in the form where a support salt (lithium salt) is dissolved in an organic solvent, that is, a plasticizer. Examples of the organic solvent used as the plasticizer include carbonates such as ethylene carbonate (EC) and propylene carbonate (PC). Examples of the support salt (lithium salt) are the same as those added in the electrode active material layers, such as $LiN(SO_2C_2F_5)_2$, $LiN(SO_2CF_3)_2$, $LiPF_6$, $LiBF_4$, $LiClO_4$, $LiAsF_6$ and $LiSO_3CF_3$.

The polymer electrolytes are classified into a polymer gel electrolyte in which an electrolyte solution is contained and a polymer solid electrolyte in which an electrolyte solution is not contained.

The polymer gel electrolyte is in the form where the above-mentioned liquid electrolyte is impregnated into a lithium-ion-conductive matrix polymer. Examples of the lithium-ion-conductive matrix polymer include polyethylene oxide (PEO), polypropylene oxide (PPO) and copolymers thereof. In these matrix polymers, the electrolytic salt such as lithium salt can be dissolved well.

The separator may be used in electrolyte layer 17 in the case where electrolyte layer 17 is formed from liquid electrolyte or gel electrolyte. Specific examples of the separator include porous films of polyolefins such as polyethylene and polypropylene, hydrocarbons such as polyvinylidene fluoride-hexafluoropropylene (PVdF-HFP) and glass fibers.

The polymer solid electrolyte is in the form where support salt (lithium salt) is dissolved in the above-mentioned matrix polymer and does not contain an organic solvent as a plasticizer. It is thus possible to obtain improvement in battery reliability with no fear of liquid leakage in the case where electrolyte layer 17 is formed from polymer solid electrolyte.

The matrix polymer of the solid gel electrolyte or polymer solid electrolyte can provide good mechanical strength by the formation of cross-links. In order to form such cross-links, it is feasible to subject a polymerizable material (such as PEO or PPO) for formation of the polymer electrolyte to any polymerization reaction such as thermal polymerization, ultraviolet polymerization, radiation induced polymerization or electron-beam induced polymerization with the use of any appropriate polymerization initiator.

In electrolyte layer 17, the non-aqueous electrolyte material can be used solely or in combination of two or more kinds thereof. Further, the electrode material of electrolyte layer 17 can be the same as or different from that of active material layer 13, 15 (3, 32).

There is no particular limitation on the thickness of electrolyte layer 17. For reduction of internal resistance, it is desirable that the thickness of electrolyte layer 17 is as small as possible. The thickness of electrolyte layer 17 is generally 1 to 100 μm, preferably 5 to 50 μm.

[Seal Portion]

Seal portion 31 is a structural part specific to bipolar battery 10 and is arranged at the outer periphery of unit cell 19 in order to prevent leakage from electrolyte layer 17. Seal portion 31 also has the function of preventing, in the battery, contact between the adjacent collectors and short circuit caused due to slight variations between ends of the laminated electrodes.

In bipolar battery 10 of FIG. 9, seal portion 31 is arranged at the outer peripheries of unit cells 19 in such a manner that seal portion 31 is held between collectors 11 of two adjacent unit cells 19 and passes through an outer edge portion of the separator, that is, the substrate medium of electrolyte layer 17. As the material of seal portion 31, there can be used polyolefin resins such as polyethylene and polypropylene, epoxy resins, rubbers and polyimide resins. Among others, polyolefin resins are preferred in terms of corrosion resistance, chemical resistance, film formation property and cost efficiency.

[Positive and Negative Collector Plates]

There is no particular limitation on the material of collector plate 25, 27 used to take out electric current from the battery. There can be used any known high conductive materials commonly used for collectors of lithium-ion secondary batteries. Preferred examples of the material of the collector plate include metal materials such as aluminum, copper, titanium, nickel, stainless steel (SUS) and alloys thereof. Among others, aluminum and copper are more preferred in terms of light weight, corrosion resistance and high electrical conductivity. Particularly preferred is aluminum. Positive electrode collector plate 25 and negative electrode collector plate 27 can be of the same material or of different materials. Alternatively, outermost collector 11a, 11b may be extended in such a manner that an end portion of outermost collector 11a, 11b functions as the collector plate. Further, a tab may be provided separately and connected to the outermost collector.

[Positive and Negative Leads]

Although omitted from the drawings, collectors 11 may be electrically connected to collector plates 25 and 27 via positive and negative leads. As the material of the positive and negative leads, there can be used any known lead materials commonly used for lithium-ion secondary batteries. It is desirable to cover any parts of the leads led out of the battery package with heat-resistant, heat-shrinkable insulating tubes etc. so as not to cause ground fault upon contact with peripheral equipment or wiring and thereby not to affect the performance of the product (automotive part, notably electronic equipment).

[Battery Package]

In the lithium-ion secondary battery, it is preferable that the whole of battery element 21 is accommodated in the battery package in order to protect battery element 21 from external impact and environmental deterioration during use. Examples of laminate film 29 as the battery package include a three-layer polymer-metal composite laminate film in which a polypropylene layer, an aluminum layer and a nylon layer are laminated in this order. Battery element 21 is accommodated and sealed in laminate films 29 by fusion bonding all of peripheral portions of laminate films 29.

[Battery Appearance]

Figure 11:
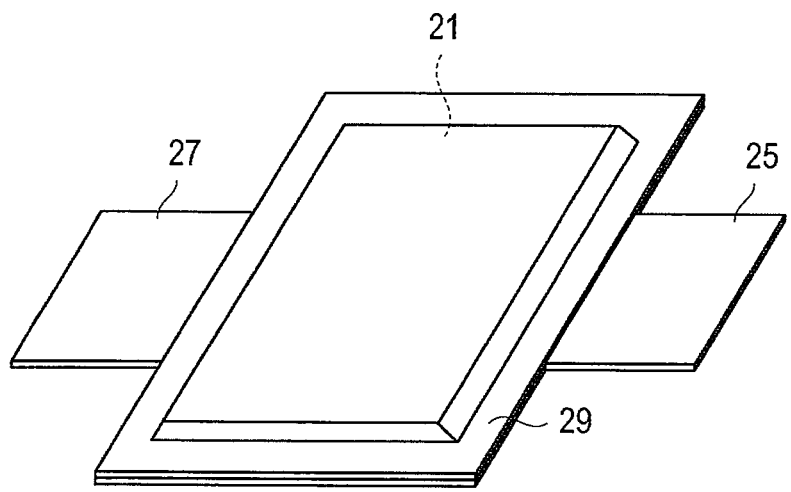
FIG. 11 is a perspective view schematically showing one example of the appearance of the lithium-ion secondary battery.

FIG. 11 is a perspective view schematically showing one example of the appearance of battery 10, 10'. There is no particular limitation on the form of battery 10, 10'. For example, battery element 21 can be formed into a flat rectangular shape and sealed in battery package 29 with collector plates 25 and 27 led out from opposite sides thereof as shown in FIG. 11. There is also no particular limitation on the lead-out of collector plates 25 and 27. Collector plates 25 and 27 can be led out from different sides of battery element 21 or can be led out from the same side of battery element 21. Alternatively, collector plates 25 and 27 can be divided into plural parts and led out from the respective sides of battery element 21.

It is feasible to form the winding-type lithium-ion secondary battery into a cylindrical shape or to deform such a cylindrical winding-type lithium-ion secondary battery into a rectangular flat shape. In the case where the battery is of cylindrical shape, there can be used as the battery package a laminate film or a conventional cylindrical can (metal can). In the case of the winding-type bipolar secondary battery, terminals may be using the cylindrical can (metal can) in place of the collector plates.

By the use of any of negative electrodes 1, 1' and 30 of the above embodiments in each of bipolar battery 10 and laminated battery 10', it is possible to relieve stress caused by expansion and contraction of negative electrode active material 3a, 36 during charging/discharging of battery 10, 10' and prevent separation of negative electrode active material 3a, 36 from negative electrode 1, 1', 30. Even when the charge/discharge cycles of battery 10, 10' are repeated, the electrode structure of negative electrode 1, 1', 30 can be maintained so as to limit increase in the resistance of negative electrode 1, 1', 30 for improvements in cycle characteristics (charge/discharge cycle resistance). Lithium-ion secondary battery 10, 10' with such good cycle characteristics can suitably be utilized as a large-capacity power source for an electric vehicle, a hybrid electric vehicle, a fuel cell vehicle, a hybrid fuel cell vehicle etc. in a vehicle-driving power supply system or auxiliary power supply system where high volume energy density and high volume output density are required.

EXAMPLES

The present invention will be described below in more detail with reference to the following examples. It should be however noted that the following examples are only illustrative and not intended to limit the invention thereto.

Example 1

Preparation of Active Material Slurry (1)

An active material slurry (1) (solid matter concentration: 60 mass %) was prepared by mixing silicon oxide (SiO) (38-μm pass product: manufactured by Kojundo Chemical Laboratory Co., Ltd.) as a negative electrode active material, Acetylene Black (HS-100: manufactured by Denki Kagaku Kogyo Kabushiki Kaisha) as a chain-like conductive material and polyamic acid (U-Varnish-A: manufactured by Ube Industries Ltd.) as a binder precursor at a mass composition ratio of 85:5:15 (SiO:HS-100:polyamic acid), and then, adding an appropriate amount of N-methyl-2-pyrrolidone (NMP) as a slurry viscosity adjusting solvent to the resulting mixture.

Preparation of Conductive Material Slurry (1)

A conductive material slurry (1) (solid matter concentration: 60 mass %) was prepared by mixing vapor grown carbon fibers (VGCF: manufactured by Showa Denko K.K.) as a fibrous conductive material and polyamic acid (the same as mentioned above) as a binder precursor at a mass composition ratio of 70:30 (VGCF:polyamic acid), and then, adding an appropriate amount of N-methyl-2-pyrrolidone (NMP) as a slurry viscosity adjusting solvent to the resulting mixture.

Production of Negative Electrode

On the other hand, a copper foil (thickness: 15 μm) was provided as a collector. The above-prepared conductive material slurry (1) was applied by a die coater to one side of the copper foil. The amount of application of the conductive material slurry (1) per unit area was 0.5 mg/cm$^2$. A surface of the resulting coating was sufficiently dried by heat treatment at 140° C. for 10 minutes. Further, the above-prepared active material slurry (1) was applied by a die coater to the surface of the coating. The amount of application of the active material slurry (1) per unit area was 5.0 mg/cm$^2$. The thus-obtained coating was dried at 120° C. for 15 minutes and heat treated at 160° C. for 5 hours under vacuum, whereby part of the polyamic acid was imidized by dehydration condensation. With this, a negative electrode with a conductive buffer layer and a negative electrode active material layer was completed.

Example 2

Preparation of Conductive Material Slurry (2)

A conductive material slurry (2) (solid matter concentration: 60 mass %) was prepared in the same manner as mentioned above in the section "Preparation of Conductive Material Slurry (1)" of Example 1, except for using Acetylene Black (HS-100: manufactured by Denki Kagaku Kogyo Kabushiki Kaisha) as a chain-like conductive material in place of the vapor grown carbon fibers.

Production of Negative Electrode

A negative electrode was produced in the same manner as mentioned above in the section "Production of Negative Electrode" of Example 1, except for using the above-prepared conductive material slurry (2) in place of the conductive material slurry (1).

Example 3

Preparation of Conductive Material Slurry (3)

A conductive material slurry (3) (solid matter concentration: 60 mass %) was prepared in the same manner as mentioned above in the section "Preparation of Conductive Material Slurry (2)" of Example 2, except for using polyvinylidene fluoride (PVDF) as a fluoro binder in place of the polyamic acid.

Production of Negative Electrode

A negative electrode was produced in the same manner as mentioned above in the section "Production of Negative Electrode" of Example 1, except for using the above-prepared conductive material slurry (3) in place of the conductive material slurry (1).

Example 4

Preparation of Conductive Material Slurry (4)

A conductive material slurry (4) (solid matter concentration: 40 mass %) was prepared in the same manner as mentioned above in the section "Preparation of Conductive Material Slurry (2)" of Example 2, except for using carboxymethoxy cellulose (CMC) and styrene-butadiene rubber (SBR) as a binder in place of the polyamic acid and using water as a slurry viscosity adjusting solvent.

Production of Negative Electrode

A negative electrode was produced in the same manner as mentioned above in the section "Production of Negative Electrode" of Example 1, except for using the above-prepared conductive material slurry (4) in place of the conductive material slurry (1) and drying the surface of the coating by heat treatment at 100° C. for 20 minutes.

Example 5

Formation of Porous Collector

A porous collector (porosity: 70%) of copper having a porous structure was formed by mixing copper metal particles (primary particle size D50=2 μm) and polyethylene particles (D50=100 μm) at a volume ratio of 3:7 (copper particles:polyethylene particles), and then, firing the resulting mixture at 600° C. for 4 hours in an inert atmosphere to thereby burn off the polyethylene particles.

Preparation of Active Material Slurry (2)

An active material slurry (2) (solid matter concentration: 20 mass %) was prepared by adding an appropriate amount of NMP to the active material slurry (1) prepared in Example 1.

Preparation of Conductive Material Slurry (5)

A conductive material slurry (5) (solid matter concentration: 10 mass %) was prepared by adding an appropriate amount of NMP to the conductive material slurry (3) prepared in Example 3.

Production of Negative Electrode

The above-formed porous collector was impregnated with the above-prepared conductive material slurry (5) and subjected to ultrasonic vibration treatment, thereby applying the conductive material slurry (5) to surfaces of pores of the porous collector. The amount of application of the conductive material slurry (5) per unit area of the porous collector was 0.5 mg/cm$^2$. A surface of the resulting coating was sufficiently dried by heat treatment at 140° C. for 10 minutes. The coated porous collector was further impregnated with the above-prepared active material slurry (2) and subjected to ultrasonic vibration treatment, thereby applying the active material slurry (2) to the coated surfaces of the pores of the porous collector. The amount of application of the active material slurry (2) per unit area of the porous collector was 5.0 mg/cm$^2$. The thus-obtained coating was dried at 120° C. for 15 minutes and heat treated at 160° C. for 5 hours under vacuum, whereby part of the polyamic acid was imidized by dehydration condensation. With this, a negative electrode was completed.

Example 6

Preparation of Conductive Material Slurry (6)

A conductive material slurry (6) (solid matter concentration: 10 mass %) was prepared by adding an appropriate amount of NMP to the active material slurry (4) prepared in Example 4.

Production of Negative Electrode

The same porous collector as that formed in Example 5 was impregnated with the above-prepared conductive material slurry (6) and subjected to ultrasonic vibration treatment, thereby applying the conductive material slurry (6) to surfaces of pores of the porous collector. The amount of application of the conductive material slurry (6) per unit area of the porous collector was 0.5 mg/cm$^2$. A surface of the resulting coating was sufficiently dried by heat treatment at 100° C. for 20 minutes. The coated porous collector was further impregnated with the active material slurry (2) prepared in Example 5 and subjected to ultrasonic vibration treatment, thereby applying the active material slurry (2) to the coated surfaces of the pores of the porous collector. The amount of application of the active material slurry (2) per unit area of the porous collector was 5.0 mg/cm$^2$. The thus-obtained coating was dried at 120° C. for 15 minutes and heat treated at 200° C. for 5 hours under vacuum, whereby part of the polyamic acid was imidized by dehydration condensation. With this, a negative electrode was completed.

Comparative Example 1

A negative electrode was produced in the same manner as in Example 1, except that the coating of the conductive material slurry (1) was not formed (i.e. the active material slurry (1) was directly applied to the surface of the copper foil).

Comparative Example 2

A negative electrode was produced in the same manner as in Example 5, except that the coating of the conductive material slurry (5) was not formed (i.e. the active material slurry (2) was directly impregnated into the porous collector).

[Performance Evaluation of Electrodes]
Hardness Measurement of Electrode Layer

Using a thermomechanical analysis instrument (TMA 4000SA manufactured by Bruker AXS Corporation), each of the produced negative electrodes was subjected to pressure measurement in order to measure a pressure applied to the layer by which the interface was defined with the active material slurry (i.e. the conductive material slurry layer in each of Examples 1 to 6 and the collector in each of Comparative Examples 1 to 2) at the time of being vertically pushed a distance of 1 μm in a room temperature atmosphere. The percentage of each of the measurement values of Examples 1 to 6 and Comparative Example 2 relative to the measurement value of Comparative Example 1 (i.e. the pressure applied to the copper foil) was determined as a relative hardness (TMA value). It can be said that, the lower the relative hardness, the less the load exerted on the interface by expansion of the active material and, accordingly, the more elastic the linkage of the active material to the interface.

[Manufacturing and Performance Evaluation of Batteries]

Coin-type batteries (electrode size: 14 mm in diameter) were manufactured using the negative electrodes of Examples 1 to 6 and Comparative Examples 1 and 2 in combination with counter electrodes of lithium metal. In each of the batteries, a polypropylene (PP) separator was used as a separator; and 2EC3DEC was used as an electrolyte solution.

Each of the manufactured coin-type batteries was subjected to charge/discharge cycle test at a rate of 0.5 C under temperature conditions of 55° C. The capacity retention of the battery after 20 test cycles was determined by dividing the discharge capacity of the battery after 20 test cycles by the discharge capacity of the battery after 1 test cycle.

The electrode configurations and evaluation results of the respective batteries are shown in TABLE 1.

TABLE 1

| | Collector | Active material slurry | Conductive material slurry | TMA value [%] | Capacity retention [%] |
|---|---|---|---|---|---|
| Example 1 | Cu foil | SiO + PI | VGCF + PI | 51 | 62 |
| Example 2 | Cu foil | SiO + PI | HS-100 + PI | 41 | 67 |
| Example 3 | Cu foil | SiO + PI | HHS-100 + PVDF | 37 | 70 |
| Example 4 | Cu foil | SiO + PI | HS-100 + CMC | 33 | 70 |
| Example 5 | Cu foam | SiO + PI | HS-100 + PVDF | 33 | 72 |
| Example 6 | Cu foam | SiO + PI | HS-100 + CMC | 29 | 75 |
| Comparative Example 1 | Cu foil | SiO + PI | — | 100 | 55 |
| Comparative Example 2 | Cu foam | SiO + PI | — | 88 | 60 |

In each of Examples 1 to 6, the negative electrode was so configured that the conductive buffer layer was interposed between the collector and the active material layer to elastically link at least part of the silicon oxide (SiO) active material of the negative electrode active material layer to the surface of the collector. As a result, the batteries of Examples 1 to 6 had improvements in capacity retention as compared to the batteries of Comparative Examples 1 and 2 as shown in TABLE 1. The reason for this is assumed to be that it was possible by the above configuration to relieve stress caused by expansion and contraction of the silicon oxide (SiO) active material during charging/discharging and prevent separation of the negative electrode active material layer from the collector.

It is apparent from comparison of Example 1 and Example 2 that the use of the chain-like conductive material led to further improvement in capacity retention. The reason for this is assumed to be that, because of the chain structure thereof, the conductive material was more likely to follow expansion and contraction of the silicon oxide (SiO) active material.

It is also apparent from comparison of Example 2 and Example 3, 4 that the use of the PVDF or CMC as the binder of the conductive buffer layer in place of the polyimide led to further improvement in capacity retention. The reason for this is assumed to be that the stress relieving effects were increased by the use of the elastic binder.

Furthermore, it is apparent from comparison of Comparative Example 2 and Example 5, 6 that the battery capacity retention was improved according to the same mechanism as mentioned above even in the case of using the porous collector. In particular, in Example 6, the imidization reaction was carried under high-temperature conditions of 200° C. as the low-melting PVDF was not used as the binder. It is assumed that, in the negative electrode active material layer, the active material particles were firmly combined together by such high-temperature imidization reaction so as to thereby allow further improvement in capacity retention.

The electrodes of Examples 1 to 6 each had a TMA value significantly lower than those of Comparative Examples 1 and 2. It has thus been confirmed that, in the electrodes of Examples 1 to 6, it was possible by the elastic linkage of the active material to the conductive material slurry layer to reduce load caused by expansion of the active material.

Example 7

(1) Formation of Porous Structural Body
(1a) Preparation of Porous Structural Body Material Slurry First, Acetylene Black (HS-100: manufactured by Denki Kagaku Kogyo Kabushiki Kaisha) as a conductive material was mixed with polyvinylidene fluoride (PVDF) as a binder. The resulting mixture was dispersed into N-methyl-2-pyrrolidone (NMP) as a slurry viscosity adjusting solvent, thereby obtaining a porous structural body material slurry. At this time, the mass composition ratio of NMP, Acetylene Black and PVDF was set to 60:35:5. The slurry was kneaded into a paste ink by a kneading machine.

(1b) Formation of Conductive Layer

A copper foil (thickness: 20 μm) was provided as a negative electrode collector. The ink obtained in the above step (a) was applied by a doctor blade to one side of the copper foil so as to form a coating of the ink with a thickness of 60 μm. By drying the coating at 80° C. for 10 minutes, a conductive layer was formed with a thickness of 30 μm on the negative electrode collector.

(1c) Formation of Bulkhead

The ink obtained in the above step (a) was further applied to a surface of the above-obtained conductive layer through a patterned screen printing plate, and then, dried at 80° C. so as to form bulkheads of 100 μm in height and 100 μm in width at a bulkhead-to-bulkhead interval of 1 mm in two-dimensional directions on the surface of the conductive layer.

Thus obtained was a laminate having, on the surface of the collector, the porous structural body in which the pores of 1 mm×1 mm×100 μm in size were formed at an interval of 100 μm in two-dimensional directions (i.e. the porous structure shown in FIGS. 4A and 4C where a=b=1 mm, c=100 μm and d1=d2=100 μm).

(2) Filling of Active Material and Conductive Fibers
(2a) Preparation of Active Material Slurry First, SiOx (amorphous of SiO and Si, average particle size: 20 μm) as a negative electrode active material, carbon fibers (fiber diameter: 10 μm, length: 30 μm) as a fibrous conductive material and polyvinylidene fluoride (PVDF) as a binder were mixed together The mass composition ratio of SiOx, carbon fibers and PVDF was set to 70:20:10. The resulting mixture was dispersed into N-methyl-2-pyrrolidone (NMP) as a slurry viscosity adjusting solvent, thereby obtaining a negative electrode active material slurry. The mass composition ratio of NMP and (SiOx+carbon fibers+PVDF) was set to 63:37.

(2b) Application and Drying

The above-obtained negative electrode active material slurry was applied to the porous structural body in such a manner as to fill in the pores (between the pore bulkheads) of the porous structural body, and then, dried at 80° C. The filling rate of the electrode materials in the pores (first pores) of the porous structural body was set to about 60 volume %.

By the above procedure, there was obtained an negative electrode having formed on the negative electrode collector a negative electrode active material layer in which the SiOx was supported by the carbon fibers in the pores of the porous structural body.

Example 8

(1) Formation of Porous Structural Body
(1a) Preparation of Porous Structural Body Material Slurry A paste ink was prepared in the same manner as in Example 7.

(1b) Formation of Conductive Layer

A sheet of Teflon (trademark) (thickness: 1 mm) was provided. The above-obtained ink was applied by a doctor blade to one side of the Teflon sheet so as to form a coating of the ink with a thickness of 500 μm. By drying the coating at 80° C., a conductive layer was formed with a thickness of 200 μm on the Teflon sheet.

(1c) Formation of Pores

On a surface of the thus-obtained conductive layer, a patterned SUS plate of 200 μm in thickness was placed. The conductive layer was subjected to sand blasting through the patterned SUS plate, thereby cutting part of the conductive layer to form pores of 100 μm in height (depth) and 100 μm in width at a pore-to-pore interval of 200 μm in two-dimensional directions in the surface of the conductive layer.

Figure 5A:
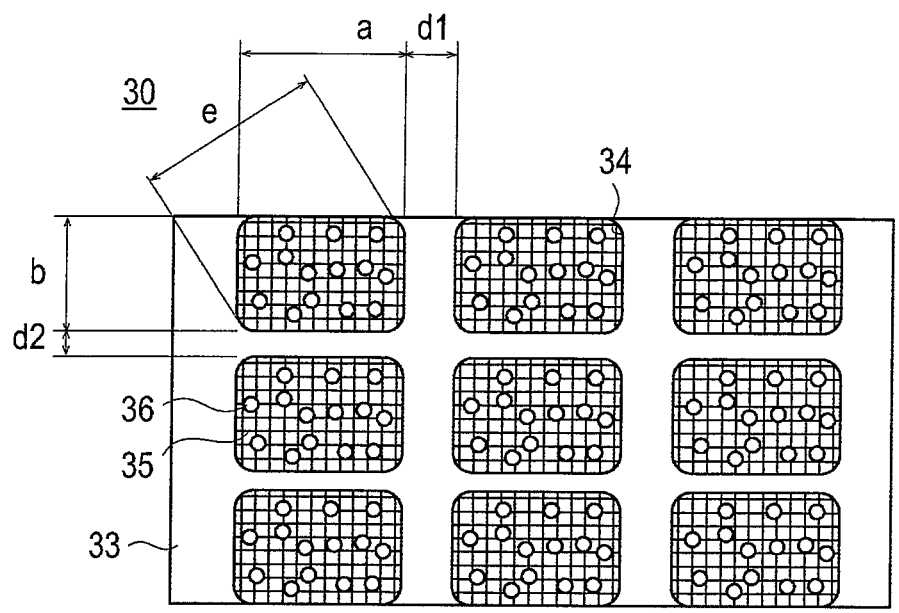
FIG. 5A is a plan view of one modified example of the negative electrode for the lithium-ion secondary battery according to the third embodiment of the present invention.
Figure 5B:
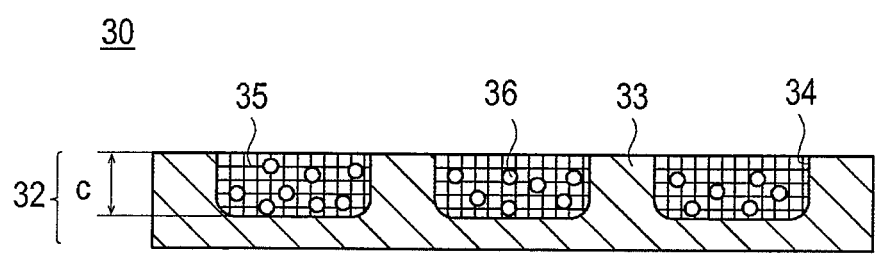
FIG. 5B is a section view of the modified example of FIG. 5A.
Figure 6A:
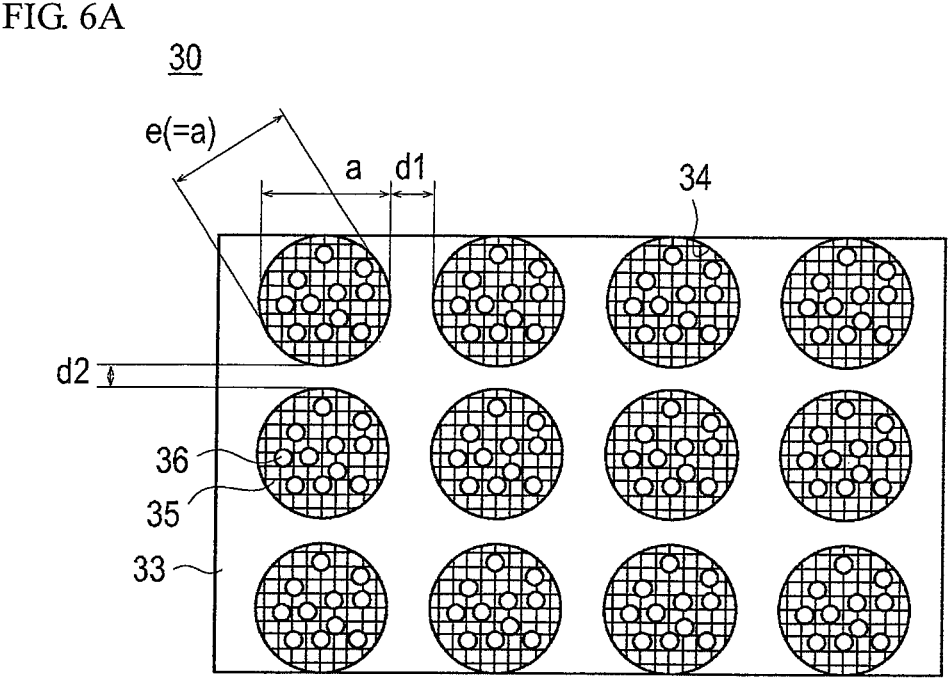
FIG. 6A is a plan view of another modified example of the negative electrode for the lithium-ion secondary battery according to the third embodiment of the present invention.
Figure 6B:
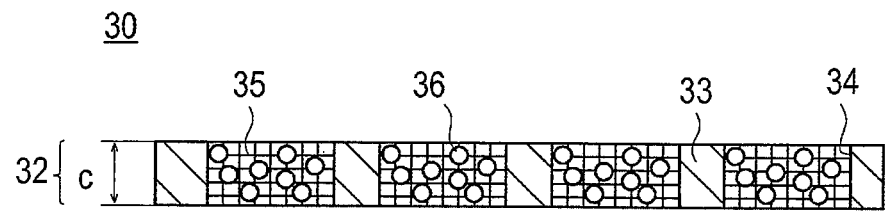
FIG. 6B is a section view of the modified example of FIG. 6A.

Thus obtained was a laminate having, on the sheet of Teflon (trademark), the porous structural body in which the pores of 1 mm×1 mm×100 μm in size were formed at an interval of 200 μm in two-dimensional directions (i.e. the porous structure shown in FIGS. 5A and 5B where a=b=1 mm, c=100 μm and d1=d2=200 μm).

(2) Filling of Active Material and Conductive Fibers
(2a) Preparation of Active Material Slurry First, SiOx (amorphous of SiO and Si, average particle size: 20 μm) as a negative electrode active material, carbon fibers (fiber diameter: 10 μm, length: 30 μm) as a fibrous conductive material and polyvinylidene fluoride (PVDF) as a binder were mixed together The mass composition ratio of SiOx, carbon fibers and PVDF was set to 70:20:10. The resulting mixture was dispersed into N-methyl-2-pyrrolidone (NMP) as a slurry viscosity adjusting solvent, thereby obtaining a negative electrode active material slurry. The mass composition ratio of NMP and (SiOx+carbon fibers+PVDF) was set to 63:37.

(2b) Application and Drying

The above-obtained negative electrode active material slurry was applied to the porous structural body in such a manner as to fill in the pores (between the pore bulkheads) of the porous structural body, and then, dried at 80° C. The filling rate of the electrode materials in the pores (first pores) of the porous structural body was set to about 60 volume %.

After that, the Teflon sheet was peeled off. There was thus obtained a negative electrode having a negative electrode active material layer in which the SiOx was supported by the carbon fibers in the pores of the porous structural body.

Comparative Example 3

A negative electrode active material slurry was prepared in the same manner as in Example 7. Further, a copper foil (thickness: 20 μm) was provided as a negative electrode collector. The prepared negative electrode active material slurry was applied by a doctor blade to one side of the copper foil so as to form a coating of the ink with a thickness of 60 μm. By drying the coating at 80° C., a negative electrode active material layer was formed with a thickness of 30 μm on the negative electrode collector. Namely, a negative electrode was produced in the same manner as in Example 7 except that: no conductive layer was formed; and the negative electrode active material layer was formed on the negative electrode collector without the use of a porous structural body.

[Performance Evaluation of Electrodes]

Lithium Doping Test

Each of the negative electrodes of Examples 7 and 8 and Comparative Examples 3 was die-cut so as to have an electrode portion of 20 mm×20 mm in size and a tab portion to be welded. A lithium foil (thickness: 30 μm), which was equivalent to 30% of the capacity of the negative electrode active material in the negative electrode active material layer, was attached to the surface of the negative electrode active material layer of each of the cut negative electrodes. The resulting aluminum-foil-attached negative electrodes were each immersed and left still in an electrolyte solution for 3 days at 50° C. The electrolyte solution used was a solution in which a lithium salt $LiPF_6$ was dissolved at a concentration of 1.0 M in a mixture of ethylene carbonate (EC) and diethyl carbonate (DEC) (EC:DEC=3:7 (volume ratio)). With this, there occurred local battery reaction between the lithium foil and the negative electrode active material layer so that lithium in the lithium foil was doped (absorbed) into the negative electrode active material in the same manner as in the charging/discharging of lithium-ion secondary battery. The lithium foil disappeared after the lithium doping. The thickness of each of the electrodes after the lithium doping (i.e. after being left still for 3 days) was measured.

The test results are shown in TABLE 2.

TABLE 2

| | Thickness (μm) of active material layer before lithium doping | Thickness (μm) of active material layer after lithium doping |
| --- | --- | --- |
| Example 7 | 130 | 130 |
| Example 8 | 200 | 200 |
| Comparative Example 3 | 30 | 60 |

As shown in TABLE 2, each of the electrodes of Examples 7 and 8 where the active material was supported by the conductive fibers in the pores of the porous structural body maintained its electrode structure with no change in the thickness of the active material layer even when lithium was doped into the active material. In the electrode of Comparative Example 3, by contrast, the thickness of the active material layer was increased from 30 μm to 60 μm by the lithium doping.

Charge/Discharge Cycle Test

1. Production of Evaluation Test Cells

The negative electrodes of Example 7 and Comparative Example 3 were each cut into a disk shape of 16 mm in diameter and used as laminating electrodes. Positive electrodes were each prepared by cutting lithium metal (thickness: 200 μm) into a disk shape of 16 mm in diameter. An evaluation test cell and a comparative evaluation test cell were each produced by placing the laminating negative electrode and positive electrode, together with two separators (porous PE films, thickness: 30 μm), in a coin cell case in such a manner that the negative electrode faced the positive electrode via the separators, filling an electrolyte solution into the case, and then, covering the case with a top lid. The electrolyte solution used herein was the same as that used for the above-mentioned lithium doping test.

2. Performance Evaluation of Evaluation Test Cells

Each of the above-produced evaluation test cells started being charged at a constant current (CC, current: 1.0 C) in an atmosphere of 25° C. After the voltage of the cell reached 4.0 V, the evaluation test cell was further charged at a constant current/constant voltage (CCCV, current: 1.0 C, voltage: 4.0V). The charge time was set to 2.5 hours. The evaluation test cell was then discharged at a constant current (CC, current: 1.0 C) until the voltage of the cell reached 2.5 V. Assuming this charge/discharge operation as one cycle, the evaluation test cell was subjected to 100 cycles of charge/discharge cycle test. The ratio of the discharge capacity of the cell in each test cycle to the discharge capacity of the cell in the first test cycle (=capacity retention (%)) was determined. Herein, the charge/discharge test of the comparative test cell using the electrode of Comparative Example 3 was stopped in mid course (after 35 test cycles).

Figure 12:
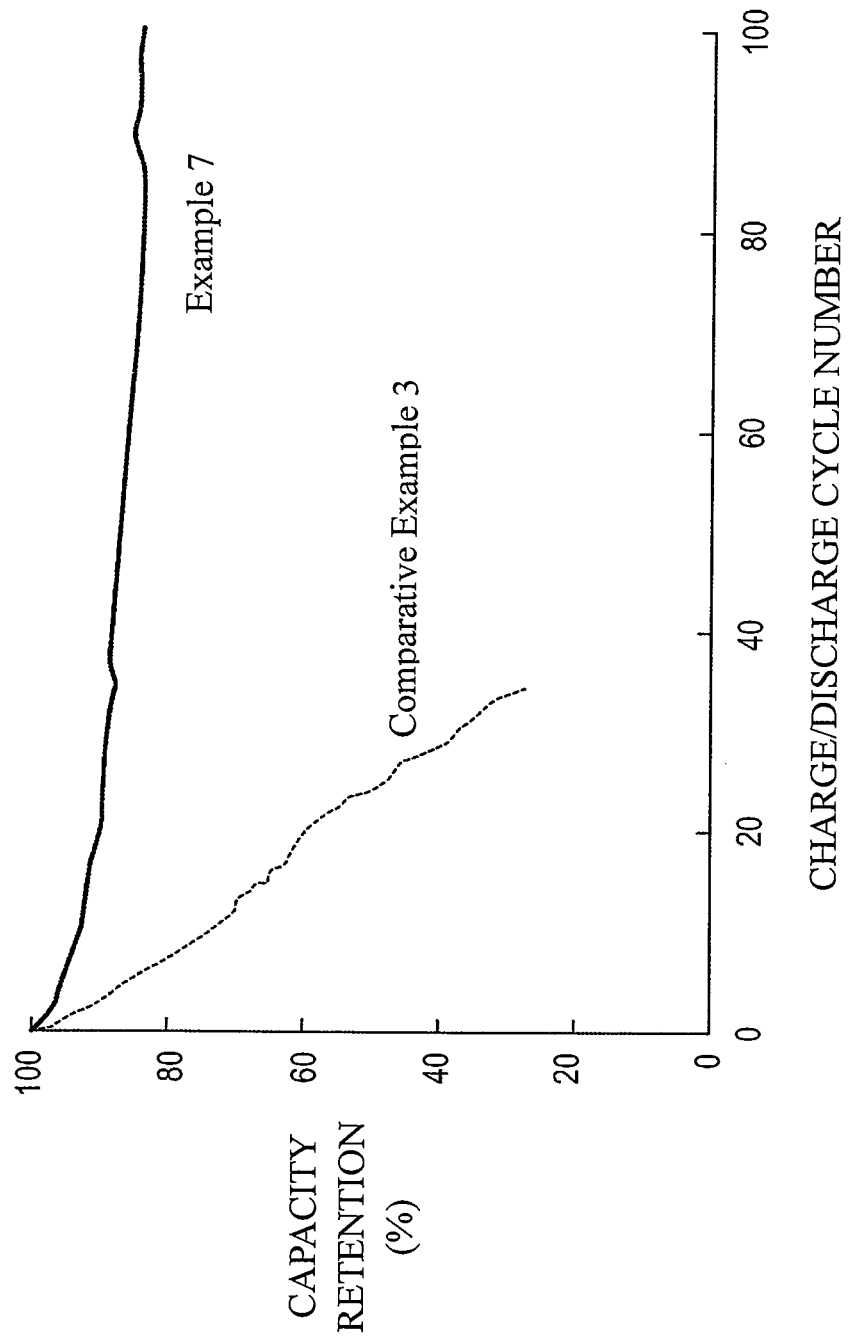
FIG. 12 is a graph showing the evaluation results of cycle characteristics of evaluation test cells according to Example and Comparative Example.

The test results are shown in FIG. 12.

As shown in FIG. 12, the evaluation test cell using the electrode of Example 7 had better charge/discharge cycle characteristics than those of the comparative evaluation test cell using the electrode of Comparative Example 3. It is assumed, in Comparative Example 3 in which the active material was not supported and retained by the conductive fibers in the pores of the porous structural body, that the structure of the electrode was likely to collapse due to expansion and contraction of the electrode so that the electrode could not maintain conduction path and deteriorate in capacity retention during repeated charge/discharge cycles. On the other hand, it is assumed, in Examples 7 and 8 in each of which the active material was supported and retained by the conductive fibers in the pores of the porous structural body, that it was possible to improve the capacity retention by maintaining the conduction path firmly in the electrode layer even during repeated charge/discharge cycles.

The invention claimed is:

1. A negative electrode for a lithium-ion secondary battery, comprising:

a conductive substrate;

a negative electrode active material layer containing a negative electrode active material capable of absorbing and desorbing lithium ions and a first conductive material; and a conductive member containing a second conductive material and having a lower elastic modulus than that of the conductive substrate, wherein at least part of the negative electrode active material is connected to a surface of the conductive substrate via the conductive member, wherein the second conductive material is a carbon material having a chain structure, and wherein the following relationship is satisfied:

$$A > 5B$$

where A is the amount of the second conductive material contained in the conductive member in mass percent, and B is the amount of the first conductive material contained in the negative electrode active material layer in mass percent.

2. The negative electrode for the lithium-ion secondary battery according to claim 1, wherein the conductive substrate is in direct contact with the conductive member.

3. The negative electrode for the lithium-ion secondary battery according to claim 2, wherein the conductive substrate is a collector having a porous structure; and wherein the conductive member is arranged on a surface of the porous structure of the collector.

4. The negative electrode for the lithium-ion secondary battery according to claim 1, wherein the conductive substrate is a porous structural body having one or more pores to retain therein the negative electrode active material.

5. The negative electrode for the lithium-ion secondary battery according to claim 1, further comprising a collector arranged on a side of the conductive substrate opposite from the negative electrode active material layer.

6. The negative electrode for the lithium-ion secondary battery according to claim 1, wherein the conductive member is either the second conductive material or a conductive layer containing the second conductive material and a binder.

7. The negative electrode for the lithium-ion secondary battery according to claim 6, wherein the binder is at least one kind selected from the group consisting of polyvinylidene fluoride, carboxymethyl cellulose, polytetrafluoroethylene, acrylic resin and styrene-butadiene rubber.

8. The negative electrode for the lithium-ion secondary battery according to claim 1, wherein the negative electrode active material contains a lithium-alloying element.

9. A lithium-ion secondary battery, comprising: the negative electrode according to claim 1.

* * * * *